US012632950B2

(12) United States Patent
Tournier et al.

(10) Patent No.: US 12,632,950 B2
(45) Date of Patent: May 19, 2026

(54) ROBOTIC BUILDING INSPECTION

(71) Applicant: Alarm.com Incorporated, Tysons, VA (US)

(72) Inventors: Glenn Tournier, Vienna, VA (US); Babak Rezvani, St Petersburg, FL (US); Donald Gerard Madden, Columbia, MD (US); Ahmad Seyfi, Reston, VA (US)

(73) Assignee: Alarm.com Incorporated, Tysons, VA (US)

( * ) Notice: Subject to any disclaimer, the term of this patent is extended or adjusted under 35 U.S.C. 154(b) by 449 days.

(21) Appl. No.: 17/486,321

(22) Filed: Sep. 27, 2021

(65) Prior Publication Data

US 2022/0101507 A1      Mar. 31, 2022

Related U.S. Application Data

(60) Provisional application No. 63/084,324, filed on Sep. 28, 2020.

(51) Int. Cl.
| | |
|---|---|
| *G06T 7/00* | (2017.01) |
| *G06Q 50/163* | (2024.01) |
| *G06T 7/60* | (2017.01) |
| *G06V 20/10* | (2022.01) |
| *G06V 20/20* | (2022.01) |

(52) U.S. Cl.
CPC .......... *G06T 7/001* (2013.01); *G06Q 50/163* (2013.01); *G06T 7/60* (2013.01); *G06V 20/176* (2022.01); *G06V 20/20* (2022.01); *G06T 2207/30124* (2013.01)

(58) Field of Classification Search
CPC . G06T 7/001; G06T 7/60; G06T 2207/30124; G06Q 50/163; G06V 10/82; G06V 20/17; G06V 20/52; G06V 20/176; G06V 20/20
See application file for complete search history.

(56) References Cited

U.S. PATENT DOCUMENTS

| | | | | |
|---|---|---|---|---|
| 2016/0004795 | A1* | 1/2016 | Novak ................... | B64U 10/13 |
| | | | | 703/1 |
| 2017/0185849 | A1* | 6/2017 | High ...................... | H04N 7/185 |
| 2018/0130196 | A1* | 5/2018 | Loveland .......... | H04N 1/00204 |
| 2018/0141789 | A1* | 5/2018 | Rudy ......................... | G06T 7/70 |
| 2019/0188473 | A1* | 6/2019 | Witt ........................ | G06V 20/64 |
| 2019/0213438 | A1* | 7/2019 | Jones ................... | G05D 1/0246 |
| 2019/0304026 | A1* | 10/2019 | Lyman ................... | G06Q 40/08 |
| 2019/0394448 | A1* | 12/2019 | Ziegler ............... | H04N 23/698 |

(Continued)

*Primary Examiner* — Amandeep Saini
*Assistant Examiner* — Mehrazul Islam
(74) *Attorney, Agent, or Firm* — Fish & Richardson P.C.

(57) ABSTRACT

Methods, systems, and apparatus, including computer programs encoded on computer-storage media, for robotic building inspection. In some implementations, one or more data objects that specify one or more requirements for a property are accessed. Sensor data of the property is obtained using a drone or other robotic device that has one or more sensors. A map is generated from the sensor data. An issue with the property is identified by comparing the map with the one or more data objects. A notification is generated based on the comparison where the notification includes an indication of the issue. The notification is transmitted to a computing device of a user.

15 Claims, 4 Drawing Sheets

(56)     References Cited

U.S. PATENT DOCUMENTS

2020/0151833 A1 *   5/2020   Bellaish ................. G06Q 40/03
2021/0125406 A1 *   4/2021   Henry ................... G08G 5/045
2021/0339769 A1 * 11/2021   Levasseur ......... B60W 60/0018

* cited by examiner

DESIGNED FLOOR PLAN

ACTUAL FLOOR PLAN

| Element | Issue |
|---|---|
| Partition Wall | Displaced 3" |
| Fire Detector 1 | Displaced 5" |
| Fire Sprinkler 1 | Missing |
| Window | Displaced 1.5"; Damaged |
| Outlet 1 | 6" from Ground |
| Outlet 2 | 7" from Ground |
| Outlet 3 | 7" from Ground |
| . . . | . . . |

ROBOTIC BUILDING INSPECTION

CROSS-REFERENCE TO RELATED APPLICATION

This application claims the benefit of U.S. Provisional Application No. 63/084,324, filed Sep. 28, 2020, and titled "ROBOTIC BUILDING INSPECTION," which is incorporated by reference in its entirety.

TECHNICAL FIELD

The present specification relates to building inspections and robotic devices.

BACKGROUND

Typical building inspections are manually performed by having a person examine the buildings in person. This can lead to oversight of construction problems with the building that might not be obvious to a human observer, or that might be overlooked as a result of human error. Relying on a person can also introduce other problems such as a reliance on a schedule of the person.

SUMMARY

In some implementations, a system may obtain and leverage knowledge of a physical environment, such as a building, through an inspection using a robotic device. The system may use the results of the inspection to determine if the physical environment has been constructed to a set of known plans, and/or to determine that the physical environment meets codes or regulations. The robotic device may be, for example, a drone equipped with one or more sensors. The system may use the drone to perform inspections of the physical environment. As an example, the system may instruct the drone to perform inspection of a building that is presently being constructed. Specifically, the system may schedule the drone to perform an inspection periodically, such as once a week, to verify that the building is being constructed accurately with respect to a set of known plans and/or is conforming to required codes or regulations. Similarly, the system may instruct the drone to perform inspections in response to certain milestones being reached. For example, the system may have the drone perform an inspection once a certain section of the building has been marked as complete, such as when the construction of a particular floor has been marked as complete.

In some implementations, the system performs a comprehensive inspection of the physical environment in that every dimension of the physical environment is inspected and/or every system of the building is checked. For example, when the system sends instructions to the drone to perform a comprehensive inspection, the drone may, in response, inspect every floor and every room on each of the floors of a building. The drone may additionally or alternatively inspect the plumbing of the building, the wiring of the building, the HVAC equipment of the building, the appliances of the building, etc. Alternatively, the system may perform an inspection of the physical environment that is limited to a particular area or to particular systems (e.g., limited to the plumbing of the building). For example, where one floor is undergoing renovations in a building, the system may send instructions to the drone to only inspect the one floor. However, the drone may still have access to the full set of building plans to, for example, be able to navigate the building to reach the desired floor.

In some implementations, the system compares the physical environment to a floor plan and/or to a template. The system may compare the physical environment to the floor plan and/or to the template in order to determine if the physical environment conforms to the floor plan and/or to the template. The template may differ from a floor plan as that it can be applicable to multiple buildings of differing layouts. Different templates may be used for different portions of the building. For example, a first template may be used for a first floor a building that is occupied by a first tenant, and a second template may be used for a second floor of the building that is occupied by a second tenant. The template selected may be based on one or more of the tenant of the building or portion of the building, the use of the building or portion of the building, the owner or lease holder of the building or portion of the building, etc.

The floor plan and/or the template may include indications of required elements in the physical environment, required locations of elements in the physical environment, location or size restrictions for elements in the environment, minimum or maximum dimensions for the physical environment or portions of the physical environment, etc. As an example, the system may use a drone to inspect a building to determine if it is conforming to a particular floor plan and to a particular template. The system may receive images from the drone and may use the images to verify that the building conforms to the floor plan and to the template. That is, the system may verify using the floor plan that the walls, windows, doors, and dimensions of the building match or substantially match what was outlined in the floor plan. Similarly, the system may verify using the template that the building includes a required minimum ceiling height, required signage, required branding, and required affordances outlined in in the template. When operating with a floor plan for a building and a template, the system may also verify that the floor plan itself satisfies the template. For example, if a template for a building specifies that doors must be 32" wide and the floor plan for the building calls for one to be 28", the system may identify the conflict and select either the template or the floor plan to align with (e.g., based on a default setting, a preference settings, etc.), or notify a user of the conflict and ask for their input to resolve it.

In some implementations, the system compares the physical environment to multiple templates. For example, the system could check a map generated for a building against a first template corresponding to the local building code, a franchise template, and a third template corresponding to the building's architectural guidelines. Placement of, for example, a branded kiosk, might be governed by all three templates. The system may automatically highlight conflicts between the templates (e.g. the franchise template states that signage should be at least 4' long, and the building's guidelines forbid signs larger than 3').

In some implementations, the system generates a floor plan for an environment. As an example, a drone may be instructed to navigate through a building and collect data that can be used to determine if the building is up to code. The drone may not have any existing plans of the building. Instead, while navigating through the building, the drone may develop a map (e.g., a two or three-dimensional map) of the building using onboard sensors such as lidar. The map may serve as a floor plan for the building. Alternatively, the drone and/or an external computing system may convert the map to a floor plan for the building. The drone and/or the external system may further highlight portions of the floor plan that correspond to code violations or other problems.

In some implementations, the system revises an existing floor plan to generate an updated floor plan for an environment. The updated floor plan may include modifications to the existing floor plan that are meant to resolve identified issues with the observed floor plan and/or with the environment. The existing floor plan may be an observed floor plan generated using sensor data collected by a drone that navigated through the environment. For example, the system may revise an observed floor plan for a building to bring the building up to code. This may include the system making changes to the size and/or location of various elements of the building, such as doors and windows. This may additionally or alternatively include the system adding new elements to the building, such as smoke detectors, sprinklers, emergency doors, etc.

In some implementations, the system suggests revisions to a floor plan for an environment. For example, the system may suggest revisions to a floor plan of a building to bring the building up to code. This may include the system suggesting changes to the size and/or location of various elements of the building, such as doors and windows. This may additionally or alternatively include the system suggesting that new elements be added to the building, such as smoke detectors, sprinklers, emergency doors, etc. These suggestions may be presented on a floor plan interface presented to a user. For example, as discussed below, the system may present an interface that allows the user to edit a floor plan. The interface may also the suggested revisions to the floor plan.

In some implementations, the system allows a user to edit the plan and then proceed to re-verify the edited plan. For example, the system may present the user an interface which shows a depiction of the generated floor plan with code violations and/or other issues highlighted. The user may proceed to user the interface to interact with the floor plan and to make various adjustments to the floor plan. For example, a user may move the location of a non-load bearing wall, to adjust step heights of a staircase and/or an entrance, etc. The user may be presented an option to submit and/or re-verify the plans. In response, the system may check the new plans for code violations and/or other issues. If any problems persist, the system may proceed to highlight the existing issues in the edited floor plan and present the highlighted, edited floor plan to the user.

In some implementations, the system checks the physical environment for damage or maintenance issues. For example, the system may use a drone to inspect a building to detect damage to the building or to detect maintenance issues. The drone may be capable of analyzing the surfaces of the building, such as walls, floors, and ceilings for damage or to assess the condition of those surfaces visually and/or through other sensors. For example, the drone may include a contact moisture sensor that it randomly or selectively applies to surfaces of the building to determine if unacceptable levels of water are present, which may indicate a leaking or broken pipe, or a roof leak. As another example, the drone may include gas and/or particulate matter sensors to inspect for fire and smoke damage.

In some implementations, the system detects changes in the physical environment over time or between specific periods of time. For example, the system may schedule a drone to perform a first inspection of a building prior to a tenant of the building moving in. The system may schedule the drone to perform a second inspection of the building when the tenant is expected to move out or when it is determined that the tenant has moved out. The system may compare the two inspections to identify changes in the property between the time the tenant moved and when the tenant moved out. The changes may indicate, for example, repairs made to the building, damage done to the building, or alterations made to the building.

In one general aspect, a computer-implemented method includes: accessing one or more data objects that specify one or more requirements for a property; obtaining sensor data of the property using a drone that has one or more sensors; generating a map from the sensor data; identifying an issue with the property by comparing the map with the one or more data objects; based on the comparison, generating a notification that includes an indication of the issue; and transmitting the notification to a computing device of a user.

Implementations can include one or more of the following features. For example, in some implementations, the method includes determining a space type for a particular portion of the property, where accessing the one or more data objects that specify one or more requirements for the property includes, in response to determining the space type, accessing a data object that specifies one or more requirements applicable to the space type for the particular portion of the property, and where identifying the issue with the property includes determining that a requirement of the one or more requirements applicable to the space type is not met.

In some implementations, determining that the requirement applicable to the space type is not met includes: accessing a portion of the map that represents the particular portion of the property; and determining, from the portion of the map, that the requirement applicable to the space requirement is not met.

In some implementations, determining the space type for the particular portion of the property includes using a subset of the sensor data to identify a space type for the particular portion of the property, where the subset of the sensor data is collected by the drone while the drone is (i) located in the particular portion of the property or (ii) using the one or more sensors to obtain data of the particular portion of the property.

In some implementations, the method includes: entering, by the drone, the particular portion of the property that the drone has not previously identified a space type for, where obtaining the sensor data of the property includes obtaining sensor data of the particular portion of the property; and identifying, by the drone and from the sensor data of the particular portion of the property, a set of elements of the particular portion of the property, where determining the space type for the particular portion of the property includes determining a space type for the particular portion of the property using the set of elements.

In some implementations, the method includes, based on the space type for the particular portion of the property, identifying a set of prioritized elements that correspond to the one or more requirements, where obtaining the sensor data of the property includes obtaining, by the drone, additional sensor data of the particular portion of the property, the additional sensor data revealing at least one of (i) additional information of the elements in the set of prioritized elements, (ii) relationship information between at least one element in the set of prioritized elements and one or more other elements of the particular portion of the property, and (iii) that at least one element in the set of prioritized elements is not present in the particular portion of the property, where generating the map from the sensor data includes generating a map of the particular portion of the property using the additional sensor data, and where determining that the requirement of the one or more requirements applicable to the space type is not met includes determining, using the map of the particular portion of the property, that a prioritized element of the set of prioritized elements does not meet a requirement applicable to the prioritized element.

In some implementations, the method includes retrieving one or more computer models for the elements in the set of prioritized elements, where the one or more data objects include the one or more computer models, where obtaining the additional sensor data includes: using a computer model of the one or more computer models corresponding to the prioritized element to detect the prioritized element in the particular portion of the property; and obtaining, using the one or more sensors of the drone, sensor data of at least one of (i) an area where the prioritized element was detected and (ii) an area immediately surrounding an area where the prioritized element was detected, and where generating the map of the particular portion of the property includes generating the map of the particular portion of the property using the sensor data of at least one of (i) the area where the prioritized element was detected and (ii) the area immediately surrounding the area where the prioritized element was detected.

In some implementations, the method includes detecting the prioritized element from the sensor data of the particular portion of the property by using a machine learning algorithm, where obtaining the additional sensor data includes obtaining, using the one or more sensors of the drone, sensor data of at least one of (i) an area where the prioritized element was detected and (ii) an area immediately surrounding an area where the prioritized element was detected, and where generating the map of the particular portion of the property includes generating the map of the particular portion of the property using the sensor data of at least one of (i) the area where the prioritized element was detected and (ii) the area immediately surrounding the area where the prioritized element was detected.

In some implementations, the method includes using the one or more requirements to determine areas in the particular portion of the property where the elements in the set of prioritized elements are expected to be located, where obtaining the additional sensor data while the drone is located in the particular portion of the property includes obtaining, using the one or more sensors of the drone, sensor data of the areas where the elements of the set of prioritized elements are expected to be located, and where generating the map of the particular portion of the property includes generating the map of the particular portion of the property using the sensor data of the areas where the elements of the set of prioritized elements are expected to be located.

In some implementations, the method includes: determining that a plan for the property is not available; and in response to determining that the plan for the property is not available, performing, by the drone, a survey of each unique space of the property that is accessible to the drone, where obtaining the sensor data of the property includes obtaining sensor data of each of the unique spaces of the property during the survey using the one or more sensors of the drone.

In some implementations, the method includes initiating a survey of at least a portion of the property using the drone in response to a triggering event, where accessing the one or more data objects includes accessing one or more data objects that correspond to a type of triggering event that the triggering event belongs to, where obtaining the sensor data includes obtaining the sensor data during the survey of the at least portion of the property, and where generating the map includes generating a map that includes observed elements of the at least portion of the property corresponding to the type of triggering event.

In some implementations, the method includes: initiating an inspection of the property for damage to one or more elements of the property using the drone, where obtaining the sensor data includes obtaining sensor data of the one or more elements during the inspection of the property; detecting, from at least a portion of the sensor data of the one or more elements, an element of the one or more elements; and in response to detecting the element, accessing a computer model for the element, where the one or more data objects include the computer model, where generating the map includes generating an observed model for the element, where identifying the issue with the property includes determining that at least a portion of the observed model deviates from the computer model of the element, and where generating the notification includes generating a notification that includes an indication that the element is damaged.

In some implementations, identifying an issue with the property by comparing the map with the one or more data objects includes: identifying, from the one or more data objects, specified measurements for at least a portion of the property; identifying, from the map, observed measurements for the at least portion of the property; and determining that one or more of the observed measurements conflicts with one or more corresponding specified measurements of the specified measurements, and generating the notification includes generating a notification indicating that there is a conflict between (i) the one or more data objects and the map, (ii) the specified measurements and the observed measurements for the at least portion of the property, or (iii) the one or more observed measurements and the one or more corresponding specified measurements.

In some implementations, determining that the one or more observed measurements conflicts with the one or more corresponding specified measurements includes determining that the one or more observed measurements do not match the one or more corresponding specified measurements.

In some implementations, determining that the one or more observed measurements conflicts with the one or more corresponding specified measurements includes determining that the one or more observed measurements deviates by at least a threshold value or a threshold percentage from the one or more corresponding specified measurements.

In some implementations, determining that the one or more observed measurements conflicts with the one or more corresponding specified measurements includes: determining, from the map, a location of an element of the property; identifying, from the one or more data objects, a specified location for the element or a permissible region for the element; and determining that the location differs from the specified location or that the location is not in the permissible region.

In some implementations, accessing the one or more data objects includes accessing a template that specifies safety requirements for the property; identifying an issue with the property by comparing the map with the one or more data objects includes determining, from the map, that at least one of the safety requirements for the property is not met; and generating the notification includes generating a notification indicating that the at least one safety requirement is not met.

In some implementations, accessing the template that specifies safety requirements includes accessing a template that specifies a height requirement for one or more particular elements of the property; and determining that the at least one safety requirement for the property is not met includes determining, from the map, that an element of the one or more particular elements has at least one of a (i) position and (ii) size that does not meet the height requirement.

Advantageous implementations can include one or more of the following features. The disclosed system can improve building inspection, construction, and safety. For example, the disclosed system can also improve building inspection, construction, and safety by using a drone to efficiently detect issues such as errors in the construction, renovation, repair, or performed maintenance of a building that might otherwise go unnoticed due to human error, lack of human inspection or time for thorough human inspection, and/or inaccuracy of tools used by a human worker. Similarly, the disclosed system can be used to improve building construction and renovation accuracy with respect to a set of plans by using a drone to perform thorough and consistent inspections through the construction/renovation of a building. The drone can efficiently compare information obtained through an inspection to the set of plans, and/or to applicable codes and regulations to efficiently and accurately identify issues with the building. By detecting an issue early in the construction or renovation process, the disclosed system can help reduce the time spent correcting the issue and/or the material resources required to correct the issue that might otherwise arise if the issue is detected at a later time and/or after construction/renovation is complete.

Moreover, the disclosed system can improve the safety afforded to building occupants and those working in or on the building by, for example, reducing the likelihood of structural failure as the construction of a building will more accurately follow a set of plans, ensuring that the building meets the applicable building codes and regulations, and/or identifying issues with a building that might otherwise be overlooked and that might present a safety hazard. For example, the system may use a drone equipped with a moisture sensor to identify a water leak that might not be readily observable. Such a leak may weaken the structure of the house, cause an electrical fire or otherwise damage the electrical system of the building, and/or lead to mold developing in the house if left unchecked, and, therefore, present serious safety hazards to occupants and workers in the building. The disclosed system can notify occupants of the building and/or workers of the building of the results of the inspection, e.g., the water leak, and/or to schedule a repair for the building to address the identified issue.

An additional advantage can include the speed at which code violations and other issues are identified in an environment. For example, a drone used to navigate through a building can take several measurements at a time, may not need to stop as often as a human counterpart, and may not need to change its position (e.g., orientation, elevation, etc.) as much as a human counterpart. Accordingly, the inspection of the building using the drone in the manner described can be done much quicker, and, as described above, more accurately.

An additional advantage can include the ability to perform remote inspections, which may improve construction speed and/or worker safety. For example, by using a drone to inspect a building, a building inspector would not be required to be on site to perform the inspection. This would allow the inspection to take place at dates and/or times when a building inspector is not available (e.g., at night, on weekends, etc.), and, therefore, could reduce the time required to complete the construction by (i) not needing to wait for a building inspector to become available and/or eliminating the time a building inspector would spend inspecting the building. Moreover, the chance of injury is also reduced by using a drone to perform remote inspections as hazardous conditions may be identified during the done inspection that may have put the building inspector or workers at risk.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
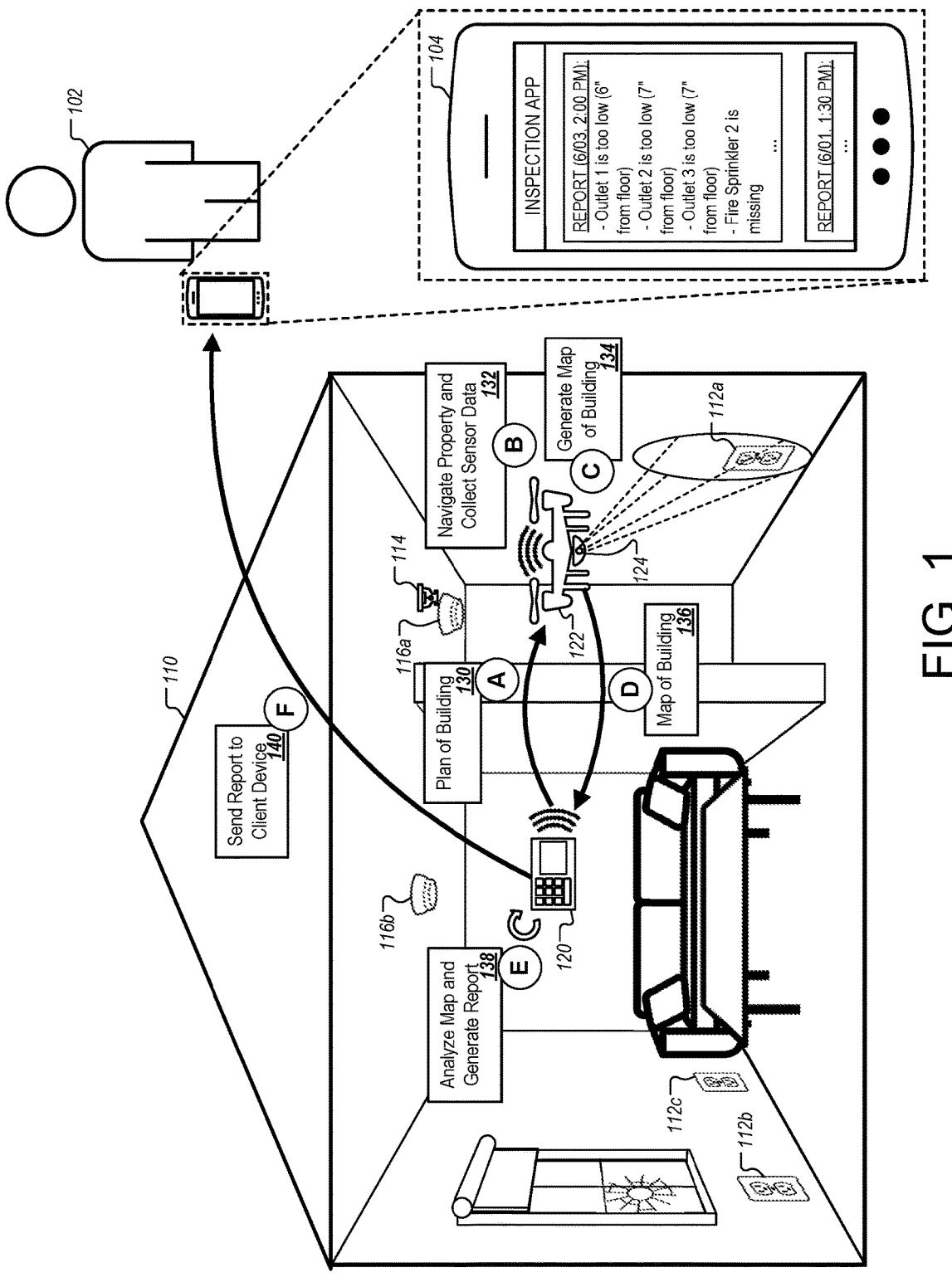
FIG. 1 is a diagram showing an example of a system for robotic building inspection.

A robotic building navigation system may obtain and leverage knowledge of a physical environment, such as a building, through an inspection using a robotic device. The system may use the results of the inspection to determine if the physical environment has been constructed to a set of known plans, and/or to determine that the physical environment meets codes or regulations. The robotic device may be, for example, a drone equipped with one or more sensors. The system may use the drone to perform inspections of the physical environment. As an example, the system may instruct the drone to perform inspection of a building that is presently being constructed. Specifically, the system may schedule the drone to perform an inspection periodically, such as once a week, to verify that the building is being constructed accurately with respect to a set of known plans and/or is conforming to required codes or regulations. Similarly, the system may instruct the drone to perform inspections in response to certain milestones being reached. For example, the system may have the drone perform an inspection once a certain section of the building has been marked as complete, such as when the construction of a particular floor has been marked as complete.

The system may perform a comprehensive inspection of the physical environment in that every dimension of the physical environment is inspected and/or every system of the building is checked. For example, when the system sends instructions to the drone to perform a comprehensive inspection, the drone may, in response, inspect every floor and every room on each of the floors of a building. The drone may additionally or alternatively inspect the plumbing of the building, the wiring of the building, the HVAC equipment of the building, the appliances of the building, etc. Alternatively, the system may perform an inspection of the physical environment that is limited to a particular area or to particular systems (e.g., limited to the plumbing of the building). For example, where one floor is undergoing renovations in a building, the system may send instructions to the drone to only inspect the one floor. However, the drone may still have access to the full set of building plans to, for example, be able to navigate the building to reach the desired floor.

The system may compare the physical environment to a floor plan and/or to a template. The system may compare the physical environment to the floor plan and/or to the template in order to determine if the physical environment conforms to the floor plan and/or to the template. The template may differ from a floor plan in that it can be applicable to multiple buildings of differing layouts. For example, the template may be a set of rules that the floor plan must adhere to, rather than a specific plan. Those rules can be relatively simple (e.g., doors must be 30" inches wide) or more complex (e.g., specifying entire subplans for rooms or floors). Codes and regulations could be expressed as a template or series of templates. For example, the template may include rules that power outlets must be at least 8" off the floor in accordance with building code. Different templates may be used for different portions of the building. For example, a first template may be used for a first floor a building that is occupied by a first tenant, and a second template may be used for a second floor of the building that is occupied by a second tenant. The template selected may be based on one or more of the tenant of the building or portion of the building, the use of the building or portion of the building, the owner or lease holder of the building or portion of the building, etc.

The floor plan and/or the template may include indications of required elements in the physical environment, required locations of elements in the physical environment, location or size restrictions for elements in the environment, minimum or maximum dimensions for the physical environment or portions of the physical environment, etc. As an example, the system may use a drone to inspect a building to determine if it is conforming to a particular floor plan and to a particular template. The system may receive images from the drone and may use the images to verify that the building conforms to the floor plan and to the template. That is, the system may verify using the floor plan that the walls, windows, doors, and dimensions of the building match or substantially match what was outlined in the floor plan. Similarly, the system may verify using the template that the building includes a required minimum ceiling height, required signage, required branding, and required affordances outlined in in the template.

The system may check the physical location for damage or maintenance issues. For example, the system may use a drone to inspect a building to detect damage to the building or to detect maintenance issues. The drone may be capable of analyzing the surfaces of the building, such as walls, floors, and ceilings for damage or to assess the condition of those surfaces visually and/or through other sensors. For example, the drone may include a contact moisture sensor that it randomly or selectively applies to surfaces of the building to determine if unacceptable levels of water are present, which may indicate a leaking or broken pipe, or a roof leak. As another example, the drone may include gas and/or particulate matter sensors to inspect for fire and smoke damage.

The system may detect changes in the physical environment over time or between specific periods of time. For example, the system may schedule a drone to perform a first inspection of a building prior to a tenant of the building moving in. The system may schedule the drone to perform a second inspection of the building when the tenant is expected to move out or when it is determined that the tenant has moved out. The system may compare the two inspections to identify changes in the property between the time the tenant moved and when the tenant moved out. The changes may indicate, for example, repairs made to the building, damage done to the building, or alterations made to the building.

FIG. 1 is a diagram showing an example of a system 100 for robotic building inspection. The system 100 includes a control unit 120, a drone 122, and a client device 104. The system 100 may use the drone 122 to inspect a building 110. The system 100 may include one or more other robotic devices that are in addition to or in place of the drone 122. For example, the system 100 may include a land-based robotic device that it uses to inspect the building 110 in addition to the drone 122 or in place of the drone 122. Using the drone 122 and/or one or more other robotic devices, the system 100 is able to inspect the building 110. For example, the system 100 can use the control unit 120 and the drone 122 to inspect the building 110 to generate a map of the building 110 (e.g., an actual floor plan) that can be compared to a floor plan, to determine if the actual construction of the building 110 matches or substantially matches the planned construction as indicated in the floor plan, to determine if any elements of the building 110 are currently in violation of building codes or regulations, to identify damaged areas of the building 110, to determine maintenance that is needed for the building 110, or to detect changes in the building 110 over time or between specific periods of time.

The system 100 may schedule inspections of the building 110 periodically or in response to particular events. For example, if the building 110 is in the process of being built, the control unit 120 may schedule the drone 122 to perform an inspection of the building once a week until the building 110 is complete. This can help to, for example, quickly identify errors in the construction of the building 110 that might otherwise go unnoticed, and/or that may require significantly more time and/or material resources to correct at a later point in the construction process.

Additionally or alternatively, the control unit 120 may schedule the drone 122 to perform an inspection in response to a particular events occurring. This dynamic scheduler of the control unit 120 may generate and send instructions to the drone 122 to perform an inspection in response to, for example, the construction of the building 110 has been marked as complete, the construction of a floor of the building 110 being marked as complete, a different construction milestone being reached (e.g., electrical for Floor 1 of the building 110 has been marked as complete, plumbing for the building 110 has been marked as complete), a construction milestone being expected to be reached (e.g., the drone 122 may be scheduled to perform an inspection based on a project plan indicating that the first floor of the building 110 is to be completed by the date of inspection), a repairman or serviceman having marked a particular repair or maintenance as complete, a repairman or serviceman being scheduled to do a repair or perform maintenance, or a turnover of a tenant of the building 110 having occurred or scheduled to occur.

The control unit 120 may receive (e.g., from the client device 104) or maintain a calendar. The calendar may include, for example, one or more project plans for the building 110. Each project plan may include one or more dates and correspond milestones that are expected to be complete by those one or more dates. A project plan may be updated manually or automatically over time. For example, each day that a particular milestone is not marked as complete, the dates corresponding to the remaining milestones (including the project's completion date) are automatically extended by one day, e.g., unless the completion date is indicated to be a hard deadline. The calendar may additionally or alternatively include indications of the schedules of construction workers or other project workers, scheduled appointments such repair and/or service appointments, lease end dates for an existing tenant of the building 110, lease start dates for a new tenant of the building 110, etc.

Additionally or alternatively, the control unit 120 may determine an inspection schedule for the drone 122 that takes into multiple factors. In determining the schedule for the drone 122, the control unit 120 may leverage one or more algorithms such as static algorithms and/or machine learning algorithms. For example, the control unit 120 may provide a project plan and/or the schedules of corresponding workers as input (e.g., a calendar maintained by the control unit 120 may be the input) to a machine learning model as input. The input of the machine learning model may also include one or more of, for example, a floor plan of the building 110, a speed or average speed of the drone 122 during inspection, and a maximum flight time of the drone 122. The output of the machine learning model may indicate, for example, the dates and/or times that the drone 122 should perform an inspection. The output of the machine learning model may also indicate a type of inspection that should be performed, e.g., the area of the building 110 that should be inspected for a particular inspection (e.g., an inspection may be scheduled for a bathroom of the building 110 at a particular date and time that is after the milestone for completing the bathroom is expected to occur, that takes into account expected constructions delays, and takes into account the schedules of workers), inspection is for verifying that the building 110 is being built accurately with respect to a floor plan, inspection is for determining if anything in the building 110 violates building codes or regulations, inspection is for determining if there is any damage to the building or if the building needs any particular maintenance, etc. The inspection schedule may be dynamic in that it may be updated by the control unit 120 in response to detected changes, such as changes to work schedules, to appointment times or dates, to anticipated milestone completion dates, etc.

Additionally or alternatively, the control unit 120 may receive an inspection schedule or a modification of an inspection schedule from a client 102 through the client device 104. For example, the client 102 may use the client device 104 to generate and send instructions to the control unit 120 to have an inspection performed immediately. As another example, the client 102 may receive an inspection schedule generated by the control unit 120 (e.g., a periodic schedule generated using default/pre-programed schedules for different situations such as the construction of a building or the construction of a building of a particular size; using the output of a machine learning model that generates a schedule; etc.). The client 102 may use, for example, a mobile application running on the client device 104 to update the inspection schedule for the drone 122. Additionally or alternatively, the client 102 may use, for example, a mobile application running on the client device 104 to update a calendar. The control unit 120 may proceed to use the updated calendar to update the inspection schedule for the drone 122.

In some cases, certain inspection outcomes trigger one or more additional scheduled inspections, and/or trigger particular inspection subtasks. For example, damage in the roof detected during an inspection might trigger an inspection for water damage below that area (e.g., immediately or at some future point in time).

FIGS. 1A-1C also illustrate various events, shown as stages (A) to (C), with each representing a step in an example process for inspecting a building using a robotic device. Stages (A) to (C) may occur in the illustrated sequence, or in a sequence that is different from the illustrated sequence. For example, some of the stages may occur concurrently.

The building 110 may be any residential or commercial building such as a house, an apartment complex, an office building, etc. The building 110 may be expected to have been built to certain specifications (e.g., a fixed floor plan or a template) that specify, for example, the size, location, and/or number of windows of the building 110, doors of the building 110, rooms of the building 110, walls of the building 110, floors of the building 110, floor/ceiling heights of the building 110, stairways of the building 110, other required elements of the building 110, etc.

The building 110 may include, or be expected to include (e.g., via a plan such as a fixed floor plan or a template), particular devices and/or devices at particular locations. These devices may be included in a floor plan for the building 110, and/or may be detected during an inspection, e.g., to compare their actual location to an expected location per a template floor plan, to ensure that their location or installation does not violate a building code or regulation, etc. The devices may include, for example, smoke detectors such as smoke detector 116a-116b, sprinklers such as a sprinkler 114, electrical outlets such as outlets 112a-112c, carbon monoxide detectors, lights, appliances, HVAC systems or components such as vents and/or registers, etc. As will be discussed in more detail with respect to FIGS. 2A-2B, an expected location for one or more of these devices may be represented in a template floor plan for the building 110. In some cases, the expected locations of devices will not match a map (e.g., an actual floor plan) generated by the drone 122 or generated from data collected by the drone 122, resulting in the generation of a notification.

Similarly, the building may include, or be expected to include (e.g., via a plan such as a fixed floor plan or a template), particular items and/or items at particular locations. These items may include, for example, particular signage or other branding, particular furniture, particular paint or wallpaper for certain walls or ceilings of the building 110, particular materials for certain areas of the building 110, etc. These items may correspond to items required by a client across multiple buildings. As an example, the control unit 120 may receive a template from the client device 104 indicating that each building corresponding to the client device 104 including the building 110, should include a particular sign above the front door on the exterior of the corresponding building, should include a bathroom on the first floor, should include a ceiling height of at least nine feet, etc.

The drone 122 is able to move around the building 110 using multiple rotors. The drone 122 may include one or more sensors. These sensors may include, for example, a camera 124, one or more additional cameras, moisture sensor(s), gas and/or particulate matter sensor(s), light sensor(s) such as ambient light sensor(s), light source(s) such as light-emitting diodes (LEDs), photoelectric laser sensor(s)

(e.g., as part of a lidar system), time of flight (ToF) sensor(s), microphone(s), inductive sensor(s), metal detector(s), radar, etc. The camera 124 may be a visible-light camera, an infrared (IR) camera, or a combination of visible-light and IR cameras. The one or more additional cameras may be visible-light cameras, IR cameras, or a combination of visible-light and IR cameras. The sensors of the drone 122 may allow the drone 122 to perform non-visual survey and inspection of building systems such as plumbing, wiring, HVAC equipment, etc.

The client device 104 may be a computing device. For example, the client device 104 may be a smart phone, a tablet, a laptop computer, a desktop computer, a PDA, etc. The client device 104 may be able to run an application such as a mobile application to manage inspections of the building 110. As will be described in more detail below, the client 102 may use the client device 104 to schedule inspections of the building 110 to be performed by the drone 122, to modify an existing inspection schedule for the building 110, to review inspection reports generated by the control unit 120, etc.

The drone 122 and the client device 104 may be able to communicate with the control unit 120, e.g., over a network. The drone 122 and the client device 104 may be able to communicate with the control unit 120 using a wireless connection, such as a Wi-Fi network, a cellular network, a Bluetooth network, etc. In addition to the control unit 120, the drone 122 may be able to communicate with connected devices of the building 110, such as appliances and building systems. The control unit 120 and/or the drone 122 may be able to run these appliance and/or building systems to verify their operation during an inspection.

The control unit 120 may include one or more computing devices. The control unit 120 may include a control panel. The control panel may provide an interface that allows the client 102 and/or other persons to interact with the control unit 120 and/or the drone 122. The control unit 120 may include one or more storage devices that it uses to, for example, store template floor plan(s) for the building 110, generated maps of the building 110, and/or generated inspection reports for the building 110. Additionally or alternatively, the control unit 120 may be able to communicate with one or more remote third-party servers or server environments, such as, for example, one or more cloud computing platforms. The control unit 120 may transmit, for example, template floor plan(s) for the building 110, generated maps of the building 110, and/or generated inspection reports for the building 110 for storage on the third-party server(s) or server environment(s). In addition to the client device 104 and the drone 122, the control unit 120 may be able to communicate with connected devices of the building 110, such as appliances and building systems. The control unit 120 and/or the drone 122 may be able to run these appliance and/or building systems to verify their operation during an inspection.

In some implementations, the drone 122 may be able to directly communicate with one or more of the security devices of the system 100 through a wireless connection.

In some implementations, a robotic device instead of the flight-capable drone 122 may be used to monitor the building 110. In these implementations, the robotic device may be a land-based device that can navigate, for example, using one or more wheels and/or legs.

In stage A, the control unit 120 transmits a plan 130 of the building 110 to the drone 122 (or to another robotic device) to perform an inspection. The plan 130 may be, for example, a predetermined floor plan (e.g., a fixed floor plan) that indicates how the building 110 is to be constructed or renovated, an actual floor plan of the building 110 (e.g., an observed floor plan of the building 110 generated using previously collected sensor data), a partial floor plan of the building 110 (e.g., a floor plan of a portion of the building 110 that the drone 122 is to inspect, and/or that the drone 122 needs to navigate in order to get to and/or from an area of the building 110 that the drone 122 is to inspect), a three-dimensional map of the building 110, a three-dimensional map of a portion of the building 110, a template applicable to all or a portion of the building 110, etc. Specifically, the plan 130 may indicate the dimensions of all or part of the building 110, the dimensions of rooms in the building 110, the location(s) of system in the building 110 (e.g., the plan 130 may indicate the locations of pipes such as the hot and cold water pipes, toilets, sinks, water meters, etc. of a plumbing system of the building 110; may indicate the locations of wires, electrical panels, outlets, switches, lights, etc. of an electrical system of the building 110; etc.), etc.

The control unit 120 may transmit the plan 130 to the drone 122 wirelessly. For example, the control unit 120 may transmit the plan 130 to the drone 122 over Wi-Fi or over a cellular network.

As an example, the drone 122 may receive the plan 130 that is a floor plan of the building 110 along with instructions to inspect the bathrooms of the building 110. The drone 122 may use the plan 130 to determine that the building 110 includes two bathrooms, and to identify the locations of the two bathrooms in the building 110. The drone 122 may proceed to use the plan 130 to navigate directly to a first bathroom to perform a first inspection before directly navigating to a second bathroom to perform a second inspection.

In response to receiving the plan 130, the drone 122 (or other robotic device) may perform one or more actions. For example, in response to receiving the plan 130, the drone 122 may, for example, undock from a charging dock, begin an inspection of the building 110 or of a portion of the building 110 (e.g., an inspection of a particular room of the building 110, a particular floor of the building 110, a particular area of the building 110, etc.), navigate to an entrance of the building 110, navigate to a location in the building 110 where the inspection is to begin (e.g., to the particular room, floor, or area of the building 110 that is to be inspected), etc.

The control unit 120 may send the plan 130 to the drone 122 (or other robotic device) in response to a triggering event. A triggering event may include the control unit 120 determining that an inspection is scheduled to begin immediately or within a threshold amount of time (e.g., ten minutes, five minutes, one minute, etc.), the control unit 120 receiving instructions from the client device 104 initiating an inspection, the control unit 120 receiving an updated calendar or updated schedules (e.g., of construction workers, of repairman or serviceman, of occupants of the building 110, etc.), the control unit 120 receiving an indication that a tenant of the building 110 has vacated the building 110, the control unit 120 receiving an indication that a milestone in the construction or renovation of the building 110 has been completed or modified, the control unit 120 receiving an indication that a repair of the building 110 has been made or that particular maintenance of the building 110 has been performed, etc.

The control unit 120 may determine that an inspection is scheduled to begin immediately or within a threshold amount of time by referring to a calendar corresponding to the building 110 that is stored locally, that is stored on the client device 104 and is accessed by the control unit 120, that is stored on a server or server environment (e.g., a cloud computing platform) and is accessed by the control unit 120, etc. The calendar may include an inspection schedule for the building 110. Additionally or alternatively, the calendar may include other data, e.g., provided by the client 102 or other persons entering information through the control panel of the control unit 120, provided by the client 102 through the client device 104, provided by other clients through corresponding client devices, etc. For example, the calendar may include schedules of workers (e.g., construction workers, repairmen, servicemen, etc.), schedules of occupants (e.g., schedules of a tenant of the building 110), scheduled appointments (e.g., service appointments, scheduled repairs, etc.), anticipated milestone completion dates (e.g., calendar may include a project plan for the building 110), etc. The control unit 120 may use all or some of this information to determine an inspection schedule for the drone 122. As described above, the control unit 120 may use one or more algorithms, such as one or more machine learning algorithms, to determine an inspection schedule for the drone 122.

In response to receiving new data such as, for example, indications of completed, delayed, or updated milestones, repairs, maintenance, and/or schedules, the control unit 120 may determine an updated inspection schedule for the drone 122. Similarly, in response to receiving new data such as, for example, indications of completed, delayed, or updated milestones, repairs, maintenance, and/or schedules, the control unit 120 may update the calendar for the building 110. For example, in response to receiving new data indicating that a milestone has been completed earlier than expected, the control unit 120 may update the anticipated completion dates of subsequent milestones accordingly.

In some cases, a floor plan is not sent to the drone 122. That is, the drone 122 may not receive the plan 130 from the control unit 120. For example, a floor plan may not exist for the building 110 or for a portion of the building 110 that the drone 122 is to inspect. Without a floor plan, the drone 122 may need to perform an exhaustive survey of the building 110 in order to find the areas of the building 110 that have been marked for inspection.

The drone 122 may receive instructions with the plan 130. The instructions may provide, for example, an indication of the area(s) or systems of the building 110 that the drone 122 is to inspect, a threshold of accuracy required for the inspection, a time and/or date that the inspection is to be performed, etc. A threshold of accuracy required for the inspection may indicate the maximum allowable error in the calculated dimensions of the building 110 or portion of the building 110. There may be multiple thresholds of accuracy for different portions of the building 110.

In stage B, the drone 122 (or other robotic device) begins an inspection of the building 110. That is, for example, the drone 122 navigates the building 110 and collects sensor data 132. The sensor data 132 may include, for example, image data collected using the camera 124 or one or more other imaging sensors. The sensor data 132 may additionally or alternatively include, for example, moisture data collected using a moisture sensor of the drone 122, data indicating the presence and/or concentration of gas(es) in the building 110 or a specific portion of the building 110 collected using a gas detector (e.g., an electrochemical gas sensor, a catalytic bead sensor, a photoionization detector, an infrared point sensor, an infrared imaging sensor, an ultrasonic gas leak detector, etc.), data indicating air quality (e.g., data indicating the detection, count, and/or concentration of particulates) in the building 110 or a specific portion of the building 110 collected using a particulate matter sensor (e.g., a laser-based particulate matter sensor), etc.

The drone 122 may navigate and collect the sensor data 132 for the entirety of the building 110 (or the entirety of the building 110 that has been constructed to date). Alternatively, the drone 122 may navigate and collect the sensor data 132 from only a portion of the building 110. For example, in response to the drone 122 receiving instructions indicating to inspect only the first floor of the building 110 or the plan 130 only including the first floor of the building 110, the drone 122 may inspect only the first floor of the building 110 (e.g., where the building 110 may have multiple floors). In detail, the control unit 120 may receive an update from the client device 104 indicating that tenant of the first floor of the building 110 has vacated the building. The control unit 120 may, in response, schedule the drone 122 to perform an inspection of the first floor of the building 110.

In navigating the building, the drone 122 may use the camera 124 and/or other equipped imaging sensors. For example, the drone 122 may use the camera 124 along with one or more three-dimensional sensors (e.g., photoelectric laser sensor(s) as part of a lidar system, ToF sensor(s), etc.) to survey the building 110, build an accurate map of the building 110 with absolute dimensions as discussed below, and to navigate the building 110. In performing these functions (e.g., in navigating the building 110), the drone 122 may use simultaneous localization and mapping (SLAM) techniques or other autonomous mapping and measurement techniques.

In navigating the building and collecting the sensor data 132, the drone 122 may take multiple measurements from various ranges or angles for a given portion of the building 110. For example, the drone 122 may use the camera 124 and/or one or more other imaging sensors to obtain data on a particular wall of the building 110. The drone 122 may change its orientation with respect to the wall, its altitude, and/or its distance from the wall while collecting imaging data on the wall. The drone 122 may only take multiple measurements from various ranges or angles for a given area/element of the building 110 if the area/element is of particular interest.

For areas/elements of the building 110 that are of particular interest, the drone 122 may take multiple measurements of the corresponding area/element from various ranges or angles, use more intensive mapping techniques (e.g., may perform SLAM at a higher resolution), use additional sensors or sensor modes (e.g., may verify an element's dimensions calculated using data from the camera 124 using data obtained from an onboard ToF sensor), or otherwise consume more resources and time in order to more accurately and confidently inspect portions of the building 110 containing the areas/elements.

The drone 122 (or the control unit 120) may identify areas or elements of the building 110 that are of particular interest to inspect. In determining an area/element of particular interest to inspect, the drone 122 (or the control unit 120) may use one or more machine learning models. As an example, a machine learning model may receive information, such as the plan 130 or map of the building 110 (or a list of known areas/elements of the building 110), historical information (e.g., previous inspections, results of previous inspections, construction milestones reached and corresponding times, repairs made and corresponding times, maintenance performed and corresponding times, etc.) on the building 110, and/or information provided by the client 102 (e.g., indication of the type of inspection to be performed, indication of malfunctioning systems of the building 110, indication of construction milestones reached, etc.), as input. The machine learning model may output numerical data that corresponds to different areas/elements of the building 110, or types of areas/elements of the building 110. The numerical data may indicate the priority of areas/ elements (or types of areas/elements) for the inspection to be performed by the drone 122. The drone 122 (or the control unit 120) may apply a threshold to the numerical data to identify what areas/elements of the building 110 (or types of areas/elements of the building 110) are of particular interest to inspect.

The drone 122 (or the control unit 120) may determine areas/elements of the building 110 that are of particular interest to inspect after identifying the areas/elements during inspection. For example, while inspecting the building 110, the drone 122 perform object recognition to identify an object as an electrical outlet. The drone 122 may use the identified type of object (e.g., electrical outlet) and/or the area of the building 110 where the object is located to determine if the object is an element of particular interest to inspect. For example, the drone 122 may compare "electrical outlet" with the output of a machine learning model to determine if the electrical outlet is of particular interest. As another example, the drone 122 may determine if there are any building codes or regulations that correspond to the identified object. The drone 122 may have received or accessed (e.g., from the control unit 120) building codes or regulations that are applicable to the building 110. The drone 122 may determine that there are one or more codes or regulations that are applicable to electrical outlets, and, in response, determine that the identified electrical outlet is an element of particular interest to inspect.

Upon identifying areas/elements that are of particular interest to inspect, the drone 122 (or the control unit 120) may determine that inspection should be limited to those areas/elements and/or that those areas/elements should be inspected with additional care during the inspection. For example, the drone 122 may spend more time collecting sensor data while inspecting those areas/elements, may collect image data from additional orientations or distances with respect to those areas/elements, may collect physical sensor data at different or additional locations in/on those areas/elements, may perform SLAM at a higher resolution while inspecting those areas/elements, etc. Continuing the example of determining that one or more building codes or regulations are applicable to an identified element of the building 110, the drone 122 may, in response, determine the extent of additional inspection that is required for the identified element based on the applicable codes or regulations. For example, if a code indicates that an electrical outlet must be at least eight inches from the floor, the drone 122 may calculate a threshold of accuracy that is needed for the inspection of the electrical outlet. If the already collected sensor data is sufficient to confirm that the electrical outlet is at least eight inches from the floor within the required threshold of accuracy, the drone 122 may determine that no additional inspection of the electrical outlet is required.

As an example, the drone 122 (or the control unit 120) may identify areas/elements of buildings in general or of the building 110 that typically experience damage or require maintenance as area/elements of particular interest to inspect. These areas/elements may include, for example, areas/elements that are expected to experience higher traffic or are determined to experience higher traffic (e.g., foyer, kitchen, floor of the foyer, etc.), elements that typically require maintenance (e.g., roof of the building 110, outdoor sections of the building 110 that are painted, etc.), elements that are likely to require maintenance based on accessed or received information corresponding to the building 110 (e.g., plumbing system of the building 110 after receiving an indication that the plumbing system is malfunctioning, electrical system of the building 110 after determining that the electrical system has not been inspected in five years, HVAC system of the building 110 after determining that the indoor temperature is a threshold percent greater than a set temperature, etc.), etc.

As another example, the drone 122 (or the control unit 120) may identify areas/elements of buildings in general or of the building 110 that have recently been associated with an event as area/elements of particular interest to inspect. For example, the drone 122 may identify areas/elements that were recently constructed, renovated, repaired, or maintained as areas/elements of particular interest to inspect. The drone 122 may identify these areas/elements from historical information stored on the control unit 120 or accessed by the control unit 120, or information provided to the drone 122 (or the control unit 120) from the client device 104.

Similarly, if the sensor data 132 indicates that particular areas/elements of the building 110 meet, exceed, or are within a percentage threshold of meeting/exceeding a threshold of accuracy, then the drone 122 may re-inspect (e.g., re-survey) the portions of the building 110 containing those areas/elements with greater care. For these areas/ elements of the building 110, the drone 122 go back to take multiple measurements of the corresponding area/element from various ranges or angles, use more intensive mapping techniques (e.g., may perform SLAM at a higher resolution), use additional sensors or sensor modes (e.g., may verify an element's dimensions calculated using data from the camera 124 using data obtained from an onboard ToF sensor), or otherwise consume more resources and time in order to more accurately and confidently inspect portions of the building 110 containing the areas/elements.

The client 102 may provide, through the client device 104 and to the control unit 120, a threshold of accuracy that should be applied throughout the entirety of the building 110, or applied to a portion of the building 110 (e.g., a portion of the building 110 that is to be inspected). As an example, the client 102 may indicate that the threshold of accuracy for the building 110 should be 0.25 inches. After surveying a hallway, the drone 122 may calculate different dimensions for a wall based on sensor data obtained from different onboard sensors. The drone 122 may average the differing results to determine the dimensions of the wall and may determine that there is an error in the determined dimensions of ±0.4 inches. In response to the error exceeding the set threshold of accuracy of 0.25 inches, the drone 122 may re-inspect the particular wall and modify its methods of inspection to include, for example, the collection of sensor data on the wall from additional (or different) angles with respect to the wall and/or from additional (or different) distances from the wall, the collection of data from one or more additional or different sensors, the implementation of higher resolution SLAM, etc.

In some cases, there are multiple thresholds of accuracy. For example, the client 102 may indicate, through the client device 104 and to the control unit 120, a first threshold of accuracy for a first portion of the building 110 (e.g., for a portion of the building 110 that is to be inspected, for a particular floor, for a particular room, for a particular element in the building 110 such as a particular door, etc.). This first threshold of accuracy may indicate, for example, that a threshold of accuracy of 0.3 inches should be applied to all bathrooms of the building 110. As an example, the client 102 may indicate, through the client device 104 and to the control unit 120, a second threshold of accuracy of 0.8 inches that should be applied to all other portions of the building 110, e.g., all areas of the building 110 that are not a bathroom.

As another example, a different client may provide, through the client device 104 or through another client device, a second threshold of accuracy that provides that the maximum threshold of accuracy should be used for the hallways of the building 110. The maximum threshold of accuracy may be variable. For example, the maximum threshold of accuracy applied by the drone 122 to a given hallway of the building 110 may depend on the dimensions (or expected dimensions from the plan 130) and be selected to ensure that the hallway is compliant with building codes or regulations (e.g., to ensure that the hallway is wide enough to be compliant with the Americans with Disabilities Act (ADA)). Specifically, if a first hallway of the building 110 has an expected width of 48 inches based on the plan 130, the drone 122 may set a threshold of accuracy for the hallway to 6.0 inches (e.g., to account for an error up to six inches for each of the walls that make up the hallway and to ensure that the hallway will still be compliant with ADA's thirty-six inch minimum width). Continuing this example, if a second hallway of the building 110 has an expected width 40 inches based on the plan 130, the drone 122 may set a threshold of accuracy for the hallway to 2.0 inches (e.g., to account for an error up to two inches for each of the walls that make up the hallway and to ensure that the hallway will still be compliant with ADA's thirty-six inch minimum width)

The client 102 may be prevented to provide thresholds of accuracy that are too low to be possible. For example, if the client 102 attempts to set a threshold of accuracy that is not within the tolerances of the sensors of the drone 122 and/or are not within construction tolerances, then a mobile application running on the client device 104 may prevent the client 102 from entering the unacceptably low threshold of accuracy or may automatically increase the threshold of accuracy to an acceptable level. For example, if the client 102 attempts to enter a threshold of accuracy of 0.02 inches, the mobile application running on the client device 104 may request from the control unit 120 a minimum threshold of accuracy given the sensor and construction tolerances, e.g., 0.10 inches. The mobile application may proceed to compare the threshold of accuracy provided by the client 102 with the minimum threshold of accuracy provided by the control unit. Here, upon determining that the entered threshold of accuracy is less than the minimum threshold of accuracy, the control unit 120 may automatically increase the set threshold of accuracy to the minimum threshold of accuracy. Additionally or alternatively, the control unit 120 may set the threshold of accuracy to the minimum threshold of accuracy in response to receiving a threshold of accuracy from the client 102 that is below the minimum threshold of accuracy.

The mobile application may display on the client device 104 and/or the control unit 120 may send to the client device 104 a notification that indicates the entered threshold of accuracy is not acceptable, what the minimum threshold of accuracy is given the sensor and construction tolerances, and/or that the threshold of accuracy has been automatically set to the minimum threshold of accuracy.

Performing an inspection of the building 110 or a portion of the building 110 may include inspecting the exterior of the building 110 or a portion of the exterior of the building 110 in addition to or in place of the interior of the building 110.

That is, the drone 122 navigating the building 110 and collecting sensor data 132 may include the drone 122 navigating around the exterior (or a portion of the exterior) of the building 110 and collecting sensor data 132 from at least a portion of the exterior of the building 110. Data collected from an inspection of the exterior of the building 110 may be used (e.g., by the control unit 120) to determine if the building 110 was built according to the plan 130 (e.g., based on the locations of windows of the building 110, locations of doors of the building 110, sizes of windows and/or doors of the building 110, dimensions of the building 110, etc.), if the building 110 is in violation of an codes or regulations (e.g., based on the sizes, locations, and/or numbers of exists of the building 110), identify damage to the building 110 (e.g., broken windows, damage to the roof, storm damage, rot damage, etc.), maintenance needed for the building 110 (e.g., new paint is needed, trim replacement needed due to rot, roof maintenance is needed due to missing shingles, etc.), etc.

The drone 122 may use the plan 130 to navigate through the building 110. For example, the drone 122 may extract the general geometry and topology of the building 110 from the plan 130 (e.g., where the plan 130 is a floor plan). The drone 122 may use this general geometry and topology to, for example, navigate to a particular area of the building 110 to start navigation and/or to generate a preliminary map of the building 110 (or a portion of the building 110) as will be discussed below.

In some cases, where a floor plan of the building 110 is not available, the drone 122 may navigate through the entirety of the building 110 to survey the building 110.

In navigating the building and collecting the sensor data 132, the drone 122 may use one or more machine learning networks to detect and/or to identify various elements of the building 110 (e.g., that are required by the plan 130). The elements of the building 110 may include, for example, architectural features and fixtures of the building. Specifically, the elements of the building 110 may include, for example, outlets, electrical switches (e.g., light switches), door handles, smoke detectors, carbon monoxide detectors, cameras, sprinklers, lights, windows, doors, walls, etc. As an example, the drone 122 may use one or more neural networks trained for scene segmentation, scene classification, and/or object detection/identification to identify various architectural features and fixtures in the building. The drone 122 and/or the control unit 120 may use these identified architectural features and fixtures to compare the inspected building 110 to the plans 130, to lookup the relevant building codes and regulations, and/or to determine if the building 110 is in compliance with the relevant building codes and regulations.

As an example, the drone 122 might detect electrical outlets, light switches, and door handles. The drone 122 may proceed to use the plan 130 and/or building codes and regulations to verify that the electrical outlets, light switches, and door handles are at the appropriate height. Similarly, the drone 122 might detect smoke detectors or sprinkler heads. The drone 122 and/or the control unit 120 may analyze their detected location and use it to verify that they provide adequate coverage according to applicable building codes.

The elements of the building 110 that the drone 122 attempts to detect and/or identify may be based on the area of the building 110 that is being inspected. For example, during an inspection of a bathroom of the building 110, the drone 122 may use the plan 130 to determine that the room to be inspected is a bathroom. Specifically, the plan 130 may include various labels for different areas of the building 110. The drone 122 may compare its current location with the plan 130 to identify an area of the building 110 that it is currently located in, and retrieve a label of "powder room", "bathroom", or "first floor bathroom" from the plan 130. The drone 122 may compare the retrieved label to a name for the area of the building 110 that is to be inspected. For example, the drone 122 may compare an area "bathroom" to be inspected provided by the client 102 through the client device 104 to the retrieved label of "bathroom" to determine that it is located in the bathroom to be inspected. Similarly, the drone 122 may use objects that it has identified in its vicinity to determine that it is in the bathroom to be inspected. For example, the drone 122 may identify a particular object as a toilet. Based on this, the drone 122 may determine that it is in the bathroom to be inspected. In response to determining Based on this determination, the drone 122 may attempt to detect specific objects such as bathtub, plumbing fixtures, grab bars, etc. The drone 122 may proceed to use the sensor data 132 to identify the locations of the specific objects. The drone 122 and/or the control unit 120 may compare the locations of the specific objects to buildings codes or regulations, such as ADA regulations.

In response to identifying an object in the building 110 (e.g., element of the building 110), the drone 122 may determine if any buildings codes or regulations are applicable to the object. Continuing the previous example, in response to identifying the toilet in the bathroom to be inspected, the drone 122 may determine if any building codes or regulations are applicable to the identified toilet. Specifically, the drone 122 may access a list of codes or regulations that are applicable to the building 110 (e.g., residential building codes and regulations provided to the drone 122 by the control unit 120 at the start of the inspection), and may perform a keyword search on the codes or regulations for "toilet" to identify codes or regulations that are applicable to the identified toilet. The drone 122 may use the identified codes or regulations to determine if additional inspection of the toilet is required, and/or what additional inspection of the toilet is required. For example, a building code may require that every residential toilet requires at least twenty-one inches of clearance in front of the toilet. In response, the drone 122 may inspect the area in front of the toilet to confirm that there is at least twenty-one inches of clearance. The drone 122 may additionally determine a threshold of accuracy required, e.g., based on the measurements of the code/regulation, known accuracy of onboard sensors, previously collected sensor data on the target object or for the area where the target object is located, etc.

In some cases, where a template is used in addition to or in place of a floor plan (e.g., where the plan 130 is a template), the drone 122 may use one or more machine learning networks to detect and/or to identify various elements of the building 110 that are required by the template. As an example, one or more machine learning algorithms, such as one or more neural networks or other recognition algorithms, may be trained to recognize certain signage, logos, and/or branding that are required by a template. The drone 122 could check the building 110 against the template to ensure the proper signage, branding, affordances, etc. are present and in place (e.g., are in a particular location required by the template, are in a particular area required by the template, are a particular distance and/or angle from a particular element of the building 110, etc.).

In stage C, the drone 122 generates a map 134 of the building 110. The map 134 may be a two-dimensional map such as, for example, an observed floor plan for the building 110 or a portion of the building 110 (e.g., the portion that was inspected), or a three-dimensional map for the building 110 or a portion of the building 110 (e.g., the portion that was inspected).

The drone 122 may generate the map 134 as it navigates through the building 110. Specifically, the drone 122 may generate the map 134 using all or a portion of the sensor data 132 collected by the camera 124 and/or one or more other imaging sensors. For example, the drone 122 may generate the map using a subset of the sensor data 132 that was collected using the camera 124 and one or more three-dimensional sensors (e.g., photoelectric laser sensor(s) as part of a lidar system, ToF sensor(s), etc.) onboard the drone 122. To generate the map 134, the drone 122 may use SLAM or other autonomous mapping and measurement techniques.

The map 134 may be of variable resolution and detail. For example, while navigating through the building 110 and collecting the sensor data 132, the drone 122 might map the majority of the building 110 with only a minimal amount of detail and/or with a minimal amount of resolution (e.g., SLAM resolution). However, for portions of the building 110 that are of particular interest (or that required re-inspection), such as areas of the building 110 that the drone 122 has been instructed to inspect, the corresponding portions of the map 134 would have increased resolution and detail.

In some cases, the drone 122 generates a preliminary map from the plan 130 (e.g., where the plan 130 is a floor plan). For example, the drone 122 may generate a preliminary three-dimensional map from the plan 130 that indicates an expected location for walls, windows, and/or doors of the building 110. As the drone 122 navigates the building 110 and collects the sensor data 132, the drone 122 can use at least a portion of the sensor data 132 to update the preliminary map and/or to verify portions of the preliminary map. For example, the drone 122 may use data collected from a ToF sensor over a particular area of the building 110 to modify the preliminary map to expand the width of a wall by 0.5".

The drone 122 may use the map 134 to assist in navigating the building 110. For example, upon completing a first inspection, instead of referring to the plan 130 to determine how to navigate to a second area of the building 110 or to an exit of the building 110, the drone 122 can use the generated map. However, the drone 122 may use the plan 130 to efficiently plot a path to reach the exit or the second area.

In stage D, the drone 122 transmits a map 136 of the building to the control unit 120. The map 136 may be the map 134, a modified version of the map 134, or a floor plan of the building 110 (or a portion of the building 110) generated from the map 134.

In stage E, the control unit 120 analyzes the map 136 and generates a report 138. The report 138 may indicate the results of the inspection, and/or notifications corresponding to the performed inspection. The control unit 120 may generate the results of the inspection by, for example, comparing the map 136 to the plan 130. Additionally or alternatively, the drone 122 may generate results of the inspection, e.g., as it performs the inspection of the building 110, and provide those results to the control unit 120.

The results of the inspection may be generated in different ways based on the type of inspection performed. As an example, when the performed inspection includes checking the dimensions of all or part of the building 110 (e.g., the inspection performed was a comprehensive inspection of the building 110), the control unit 120 may access the plan 130 and compare the plan 130 to the map 136. In comparing the plan 130 to the map 136, the control unit 120 may simplify the map 136 to better compare it to the plan 130. For example, the control unit 120 may remove non-structural items from the map 136, may perform simplification of polygonal surfaces to reduce the polygon count (e.g., to combine surfaces that belong to the same wall, floor, ceiling, etc. of the building 110), and/or may convert the map 136 to a two dimensional representation.

In comparing the plan 130 to the map 136, the control unit 120 may determine, for example, if the dimensions of the building 110 as constructed/renovated matches or substantially matches (e.g., within the threshold of accuracy) the corresponding dimensions in the plan 130, if the dimensions of part of the building 110 as constructed/renovated matches or substantially matches (e.g., within a particular threshold of accuracy) the corresponding dimensions in the plan 130, and/or the elements of the building 110 that are responsible for a conflict between the building 110 as constructed/renovated and the plan 130 (e.g., the particular wall that is not in the planned location).

As another example, when the performed inspection includes checking to see if all or part of the building 110 is in compliance with applicable building codes and regulations, the control unit 120 may access applicable building codes and regulations and may compare the accessed codes and regulations to the map 136. The codes and regulations may be stored locally in long-term storage of the control unit 120, may be accessed from network accessible resources such as from one or more remote servers, may be provided by the client 102 through the client device 104, etc. The codes and regulations accessed by the control unit 120 may depend on the location of the building 110 (e.g., the country, state, city, and/or county where the building 110 is located), on the type of building that the building 110 is (e.g., single-family home, apartments, commercial office, commercial industrial, etc.), and/or on the size of the building 110 (e.g., the square footage of the building 110).

In comparing the plan 130 to the map 136, the control unit 120 may determine, for example, if the building 110 or a portion of the building 110 is compliant with the applicable codes and regulations, if the building 110 or a portion of the building 110 is presently in violation of one or more codes and regulations, the specific codes and/or regulations that the building 110 or portion of the building 110 are not in compliance with, and/or the particular elements of the building 110 that are in violation of a code or regulation (e.g., particular hallway that is too narrow, section of wires that were improperly insulated, outlets that are too close to the floor, stairs that include uneven or varying height steps, etc.).

As another example, when an inspection includes comparing the building 110 against a template (e.g., a set of building preferences and/or requirements that are applicable to multiple buildings), the control unit 120 may access or receive a template and proceed to compare the template to the map 136. The accessed or received template may be stored locally in long-term storage of the control unit 120, may be accessed from a network accessible resource such as from a remote server, may be provided by the client 102 through the client device 104, etc. The control unit 120 may analyze the template to determine what the template requires. For example, in analyzing the template, the control unit 120 may determine one or more elements, sizes of elements, and/or locations of elements that the template requires of the building 110.

In comparing a template to the map 136, the control unit 120 may determine, for example, if the building 110 or a portion of the building 110 adheres to the template, if the building 110 or a portion of the building 110 does not adhere to the template, a part of the template that the building 110 or a portion of the building 110 does not adhere to (e.g., building 110 does not include required signage, branding, furniture, etc. per the template), etc. In comparing the template to the map 136, the control unit As another example, when an inspection includes checking the building 110 for damage or maintenance issues, the control unit 120 may compare the map 136 to the plan 130, analyze the map 136, and/or analyze the collected sensor data 132. As an example, the control unit 120 may compare the map 136 with the plan 130 to identify areas of the building where damage is likely to occur (e.g., high traffic areas such as the foyer or the kitchen; areas that have water pipes above them; areas that are near previously detected damage such as a portion of the second floor ceiling directly below a group of missing shingles) or that correspond with common maintenances issues (e.g., areas that include air filter vents; an area that corresponds to a roof of the building 110; areas that include gutters of the building 110, etc.).

Additionally or alternatively, the control unit 120 may analyze the map 136 or collected image data to, for example, visually identify damage and/or maintenance issues such as holes in walls, water stains, broken fixtures, etc. Similarly, the control unit 120 can analyze the collected sensor data 132 to identify damage to the building or a maintenance issue, to verify damage or a maintenance issue that was expected at a given location in the building 110, and/or to verify damage or a maintenance issue that was visually identified (e.g., by the control unit 120 using the map 136). As an example, the control unit 120 may analyze the map 136 to identify (or the drone 122 may identify during inspection) a wall of the building 110 that appears to have water damage. The control unit 120 may analyze moisture data of the collected sensor data 132 measured from that wall to verify that the wall includes a very high moisture content. The control unit 120 may conclude that there is water leak caused by either damage to the room of the building 110 or by a leaking/busted water pipe. In response to this determination, the control unit 120 may schedule an inspection of the roof the building 110 to verify that the roof is damaged or to rule out damage to the roof being a cause of the detected water damage.

As another example, when an inspection includes detecting changes in the building 110 over different periods of time (e.g., between rental periods of tenants of the building 110), the control unit 120 may compare the map 136 to a previously generated map of the building or portion of the building (e.g., a map of the first floor of the building 110), and/or may compare image data of the collected sensor data 132 with previously collected image data. As an example, the control unit 120 may compare part of the map 136 that represents the first floor of the building 110 after a rental period has ended to a part of a previously generated map that represents the first floor of the building 110 prior to the rental period to identify, for example, physical damage done to the first floor over the rental period, elements of the building 110 that are missing (e.g., removed light fixtures), elements of the building 110 that are damaged, etc. The control unit 120 may similarly compare image data of the collected sensor data 132 that was taken after a rental period has ended to image data that was collected prior to the rental period to identify, for example, physical damage done to the building 110 over the rental period, elements of the building 110 that have been removed or modified (e.g., walls have been painted), etc.

When the performed inspection includes checking the dimensions of all or part of the building 110, the report 138 and/or the notifications may include, for example, one or more of an indication that the dimensions of the building 110 match or substantially match (e.g., within the threshold of accuracy) corresponding dimensions in the plan 130, an indication that the dimensions of the building 110 do not match or substantially match (e.g., were outside the threshold accuracy) the corresponding dimensions in the plan 130, an indication that dimensions corresponding to a portion of the building 110 (e.g., a room, a hallway, floor ceiling height, etc.) match or substantially match corresponding dimensions in the plan 130, an indication that dimensions corresponding to a portion of the building 110 (e.g., a room, a hallway, floor ceiling height, etc.) do not match or substantially match corresponding dimensions in the plan 130, or an indication of elements of the building 110 that are incorrectly sized and/or positioned.

When the inspection performed inspection includes checking the building 110 or a part of the building 110 for building code or regulation violations, the report 138 and/or the notifications may include, for example, one or more of an indication that the building 110 is in compliance with the applicable codes or regulations, an indication that the building 110 is in violation of at least one applicable code or regulation, an indication of the codes or regulations that the building 110 is being inspected for, an indication of the codes or regulations that the building 110 is not in compliance with, etc.

When an inspection includes comparing the building 110 against a template or a part of the building 110 against a template, the report 138 and/or the notifications may include, for example, one or more of an indication that the building 110 or a portion of the building 110 adheres to the template, an indication that the building 110 or a portion of the building 110 does not adhere to the template, an indication of a part of the template that the building 110 or a portion of the building 110 does not adhere to (e.g., building 110 does not include required signage, branding, furniture, etc. per the template), etc.

When an inspection includes checking the building 110 for damage or maintenance issues, the report 138 and/or the notifications may include, for example, one or more of an indication that the building 110 or a portion of the building 110 has damage, an indication that the building 110 or a portion of the building 110 requires maintenance, an indication of the type of damage detected, an indication of the type of maintenance issue detected, an indication of the one or more elements of the building 110 that have experienced damage and, optionally, the corresponding type of damage, an indication of the one or more elements of the building 110 that require maintenance and, optionally, the corresponding type of maintenance, etc.

When an inspection includes detecting changes in the building 110 over different periods of time, the report 138 and/or the notifications may include, for example, one or more of an indication of the date and/or time when a period of time (e.g., start date of rental period) began, an indication of the date and/or time when that period of time ended (e.g., end date of rental period), an indication of the damages that occurred over the period of time, an indication of the modifications to the building 110 that occurred over the period of time, etc.

As an example, the report 138 generated by the control unit 120 may provide that the first outlet 112*a* is too low (e.g., in violation of one or more building codes or regulations; in violation of one or more building preferences set by the client 102 in a template) at only six inches from the floor, that the second outlet 112*b* and third outlet 112*c* are also too low as each is only seven inches from the floor, and a second fire sprinkler is missing (e.g., the plan 130 indicated that a fire sprinkler was meant to be mounted near the second smoke detector 116*b*).

As an example, the report 138 may include an indication of when (e.g., time and/or date) the corresponding inspection of the building 110 or portion of the building 110 was performed. For example, the report 138 includes an indication that the inspection was performed on Jun. 3, 2020 at 2:00 pm.

In stage F, the control unit 120 sends the report 138 to the client device 104 (140). For example, the control unit 120 may wirelessly transmit the report 138 to the client device 104 over a cellular network.

After receiving the report 138, the client device 104 may display the report on an interface of the client device 104. For example, a mobile application running on the client device 104 may display the report 138 on a GUI of the client device 104. The report 138 and its corresponding representation on the interface of the client device 104 may include one or more notifications and corresponding visual alerts for issues detected during the inspection.

When operating with a floor plan for the building 110 and a template, the system 100 may also verify that the floor plan itself satisfies the template. For example, if a template for a building specifies that doors must be 32" wide and the floor plan for the building calls for one to be 28", the control unit 120 (and/or the drone 122) may identify the conflict and select either the template or the floor plan to align with (e.g., based on a default setting, a preference settings, etc.), or notify the client 102 of the conflict and ask for their input to resolve it.

In some cases, the system 100 compares the building 110 to multiple templates. For example, the control unit 120 (and/or the drone 122) could check a map generated for the building 110 against a first template corresponding to the local building code, a franchise template, and a third template corresponding to the building 110's architectural guidelines. Placement of, for example, a branded kiosk in the building 110, might be governed by all three templates. The control unit 120 (and/or the drone 122) may automatically highlight conflicts between the templates (e.g. the franchise template states that signage should be at least 4' long, and the building 110's guidelines forbid signs larger than 3').

In some cases, the system 100 generates a floor plan for the building 110. As an example, the drone 122 may be instructed to navigate through the building 110 and collect data that can be used to determine if the building 110 is up to code. The drone 122 may not have any existing plans of the building 110, and/or may not use any existing plans of the building 110 when performing an inspection. Instead, while navigating through the building 110, the drone 122 may develop a map (e.g., a two or three-dimensional map) of the building 110 using onboard sensors such as lidar. The map may serve as a floor plan for the building 110. Alternatively, the drone and/or an external computing system may convert the map to a floor plan for the building 110. The drone 122 and/or the control unit 120 may further highlight portions of the floor plan that correspond to code violations or other problems detected during the inspection.

In some cases, the system 100 revises an existing floor plan to generate an updated floor plan for the building 110. The updated floor plan may include modifications to the existing floor plan that are meant to resolve identified issues with the observed floor plan and/or with the building. The existing floor plan may be an observed floor plan generated using sensor data collected by the drone 122 that navigated through the building 110. For example, the control unit 120 (and/or the drone 122) may revise an observed floor plan for the building 110 to bring the building 110 up to local code. This may include the control unit 120 (and/or the drone 122) making changes to the size and/or location of various elements of the building 110, such as doors and windows. This may additionally or alternatively include the control unit 120 (and/or the drone 122) adding new elements to the building 110, such as smoke detectors, sprinklers, emergency doors, etc.

In some cases, the system 100 suggests revisions to a floor plan for the building 110. For example, the control unit 120 (and/or the drone 122) may suggest revisions to a floor plan of the building 110 to bring the building up to local code. This may include the control unit 120 (and/or the drone 122) suggesting changes to the size and/or location of various elements of the building 110, such as doors and windows. This may additionally or alternatively include the control unit 120 (and/or the drone 122) suggesting that new elements be added to the building 110, such as smoke detectors, sprinklers, emergency doors, etc. These suggestions may be presented on a floor plan interface (e.g., of the inspection application) of the client device 104 to the client 102. For example, as discussed below, the control unit 120 (and/or the drone 122) may present an interface on the client device 104 that allows the client 102 to edit a floor plan. The interface may also the suggested revisions to the floor plan.

In some cases, the system 100 allows the client 102 (or an architect, a construction worker, a building inspector, etc.) to edit the plan and then proceed to re-verify the edited plan. For example, the control unit 120 may send instructions to the client device 104 to present the client 102 an interface on the client device 104 which shows a depiction of the generated floor plan with code violations and/or other issues highlighted. The client 102 may proceed to user the interface to interact with the floor plan and to make various adjustments to the floor plan. For example, the client 102 may move the location of a non-load bearing wall in a floor plan for the building 110, to adjust step heights of a staircase and/or an entrance, etc. The client 102 may be presented an option on the interface of the client device 104 to submit and/or re-verify the plans. In response, the client device 104 and/or the control unit 120 may check the new plans for code violations and/or other issues. If any problems persist, the client device 104 and/or the control unit 120 may proceed to highlight the existing issues in the edited floor plan and present the highlighted, edited floor plan to the client 102 on their client device 104.

Figure 2A:
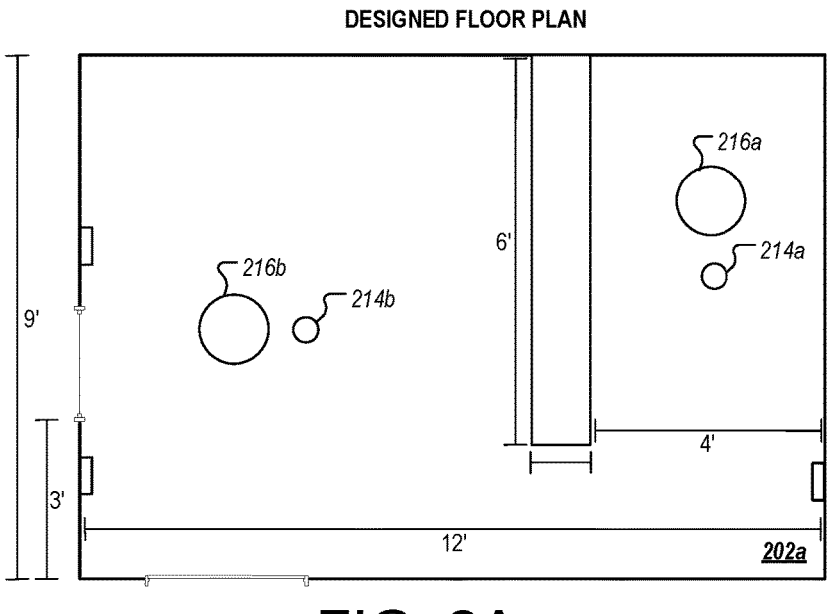
FIGS. 2A-2B are diagrams showing an example floor plan and an example modified floor plan generated from data collected during a building inspection.
Figure 2B:
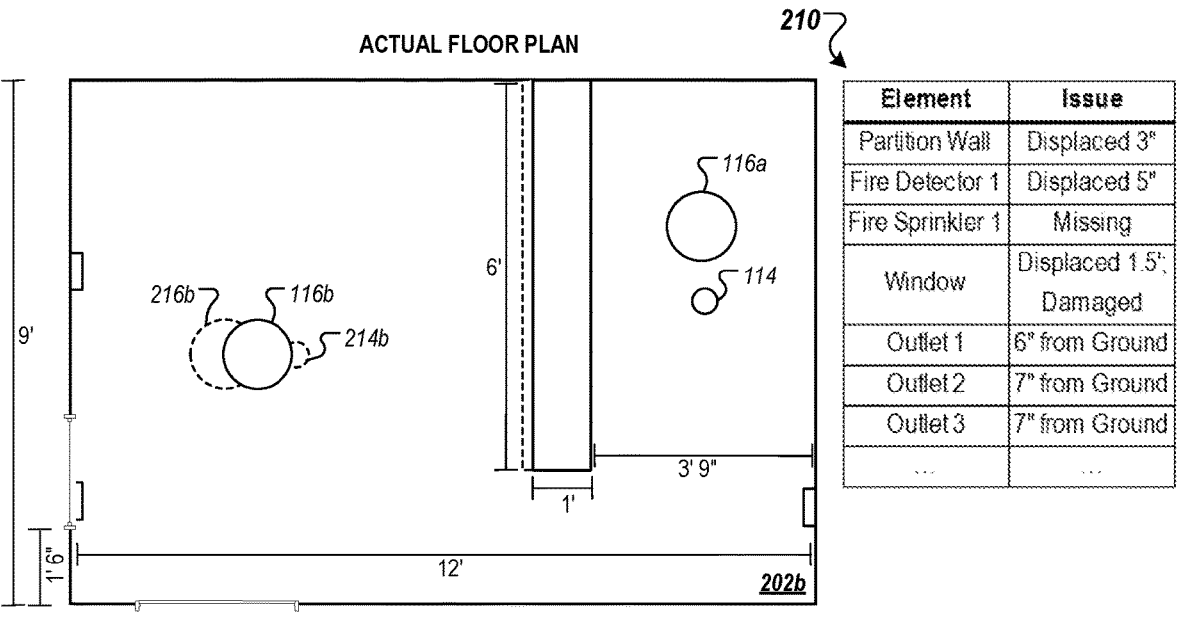

FIGS. 2A-2B are diagrams showing an example floor plan 202a and an example actual floor plan 202b generated from data collected during a building inspection.

In FIG. 2A, the floor plan 202a is shown. The floor plan 202a may be a floor plan for the building 110 or a portion of the building 110, such as the first floor of the building 110. The floor plan 202a may include indications of the planned or expected dimensions of the building 110, or the planned or expected dimensions for a portion of the building 110

(e.g., a portion undergoing construction or renovation). The floor plan 202a may also include indications of elements of the building 110, such as indications of the particular element that is to be included in the building and its location in the building 110 (e.g., mounting location). For example, the floor plan 202a includes a representation of a smoke detector 216a that corresponds to the first smoke detector 116a, a representation of a smoke detector 216b that corresponds to the second smoke detector 116b, a representation of a sprinkler 214a that corresponds to the sprinkler 114, and a representation of a sprinkler 214b.

In some cases, the floor plan 202a is the plan 130 discussed above with respect to FIG. 1.

In FIG. 2B, an actual floor plan 202b is shown. The actual floor plan 202b may be generated by the control unit 120 from the collected sensor data 132 and/or from the map 136. The actual floor plan 202b includes a representation of the smoke detector 116a, the smoke detector 116b, and the sprinkler 114.

As shown, there are various differences between the floor plan 202a and the actual floor plan 202b. These differences may indicate that the differences that exist between the building 110 as planned and as presently constructed, and/or the issues with the construction of the building 110. These various differences/issues are presented in a table 210, and, optionally, may be included in a report generated by the control unit 120.

Figure 3:
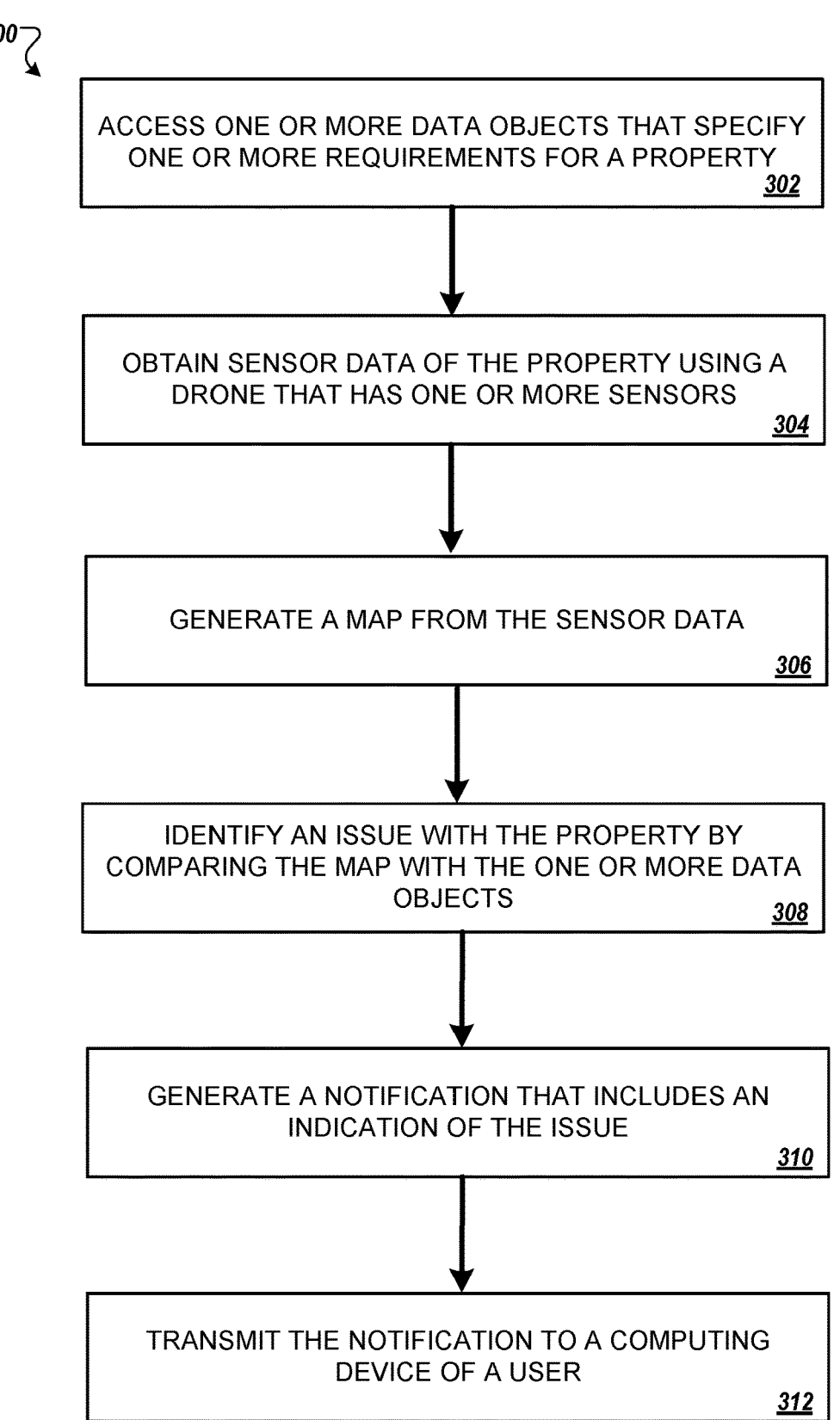
FIG. 3 is a flow diagram illustrating an example of a process for inspecting a building using a robotic device.

FIG. 3 is a flow diagram illustrating an example of a process for inspecting a building using a robotic device. The process 300 can be performed, at least in part, using the system 100 described in FIG. 1 or the monitoring system 400 described in FIG. 4. For example, the process 300 can be performed by the drone 122, the control unit 120, or a combination of the drone 122 and the control unit 120.

The process 300 includes accessing one or more data objects that specify one or more requirements for a property (302). The one or more data objects can include a plan and/or a three-dimensional model for a property. For example, as shown in FIG. 1, the drone 122 may receive a plan 130 of the building 110. The plan 130 may be, for example, a floor plan such as the floor plan 202a shown in FIG. 2A or a computer-aided design (CAD) model for the building 110.

The one or more data objects can specify various design aspects for the property. For example, the one or more data objects can include a plan for at least a portion of the property that specifies the dimensions for different spaces for the property (e.g., different rooms of the property, different floors of the property, etc.). The plan can also or alternatively specify the size and location of different elements of the property, such as the size and location of structural elements (e.g., walls, door frames, or window frames) or other elements (e.g., doors, windows, stairs or steps, etc.). The plan may be, for example, a floor plan for the entire property, a particular floor of the property, or a particular room or space of the property.

There may be multiple plans that each correspond to a different space types. For example, the one or more data objects can include a plan for a bathroom or a specific type of bathroom (e.g., full bath, three-quarters bath, half bath, handicap accessible bath, adult bathroom, elementary bathroom, etc.). In more detail, a plan for a handicap accessible bathroom can specify the dimensions for the bathroom or acceptable dimensions for the bathroom, such as a minimum door width to allow for wheel-chairs to enter and exit the bathroom, minimum corridor width within the bathroom to provide access to particular elements of the bathroom such as a toilet, etc. The plan can also specify required elements for the handicap accessible bathroom (e.g., grab handles, toilet, wheel-chair accessible shower or bath, sink, etc.), particular locations for required elements or areas where the required elements are permitted to be located (e.g., with respect to structural elements of the space such as a door frame, or with respect to other elements such as a toilet), and/or particular sizes for required elements or a range of acceptable sizes for the required elements. For example, the plan may specify that the sink must have a maximum height of 34" above the floor of the bathroom and maintain a minimum knee clearance of 27" under the sink in order to comply with ADA code.

The system 100 may generate the plan using a floor plan design for the property along with requirements for elements of the property or the particular space type. For example, the control unit 120 may generate the plan for the handicap accessible bathroom using portions of ADA code applicable to bathrooms and a floor plan design for the bathroom of the property.

As another example, the one or more data objects can include all or part of a three-dimensional design model that specifies various design aspects for the property. The three-dimensional model can indicate the dimensions for different spaces for the property, such as the different rooms of the property, different floors of the property, etc. The three-dimensional design model can also or alternatively specify the size and location of different elements of the property, such as the size and location of structural elements (e.g., walls, door frames, or window frames) or other elements (e.g., doors, windows, stairs or steps, electrical outlets, smoke detectors, security devices, etc.). For example, the three-dimensional design model can show where each electrical outlet was designed to be placed in a particular bedroom of the property, e.g., a height between the electrical outlet and the floor of the room, a height between the electrical outlet and the ceiling of the room, a distance of the electrical outlet to one or more other walls of the room, etc.

The three-dimensional model may include one or more layers that correspond to different types of property elements or to different types of property spaces. For example, a first layer can correspond to a bathroom or a particular type of bathroom (e.g., full bath, three-quarters bath, half bath, handicap accessible bath, etc.) and specify design requirements for this type of space. The first layer may specify required elements for the space type (e.g., handle bars, toilet, toilet paper dispenser, sink, etc.), particular locations for required elements or areas where the required elements are permitted to be located (e.g., with respect to structural elements of the space such as a door frame, or with respect to other elements such as a toilet), and/or particular sizes for required elements or a range of acceptable sizes for the required elements. This layer may be generated based on a model for at least a portion of the property and/or rules for the type of space. For example, the control unit 120 may use ADA compliance codes to modify a bathroom layer to indicate the acceptable areas and/or sizes for different bathroom elements.

As another example, a base layer may depict the dimensions for the different spaces of the property and the location of structural elements of the property (e.g., room dimensions, hallway dimensions, doorway dimensions, window dimensions, wall thicknesses, stair locations, etc.). An electrical layer may depict the sizes and locations of electrical equipment and wiring, such as electrical outlets, electrical panels, etc. An HVAC layer may depict the sizes and locations of ducts, registers, vents, heating elements, and/or cooling elements.

Various other layer examples are possible. For example, different layers may correspond to different maintenance needs or times. In more detail, a first layer may include elements (e.g., equipment in the property, structural elements of the property, etc.) that require maintenance or maintenance checks once a year. The control unit 120 may schedule the drone 122 to perform an inspection of the elements included in this layer at a particular time once per year. As will be discussed in more detail below, the drone 122 can compare the observed elements to models for the elements to identify damage to the elements in the property and, in response, perform an action such as scheduling repair of the element.

The one or more data objects can include image data or models, such as three-dimensional models, for particular elements of the property. The image data can include images or isolated portions of images containing a representation of a particular element, e.g., an electrical outlet, a window, a smoke detector, etc. For example, the control unit 120 can generate models for a set of elements of the building 110 using images captured by the drone 122 (e.g., using the camera 124) during a previous inspection of the building 110.

Models or images for particular elements may have been previously generated by the drone 122 during a previous inspection of the property. For example, the control unit 120 may access a set of images captured by the drone 122 during one or more previous inspections of the building 110. The control unit 120 can isolate particular objects from the images and save the isolated portions of the images. For example, the control unit 120 may perform object recognition on the images to identify the particular objects or types of objects represented in the images. Additionally or alternatively, feedback from one or more users may be used to identify the particular objects or types of objects represented in the images. The control unit 120 may proceed to isolate those portions of the images, e.g., such that each portion includes only a single object. The image portions may be used to improve one or more object recognition algorithms, e.g., for the drone 122 to later use to more accurately identify objects in the building 110 during later investigations. Additionally or alternatively, the images may be used by the control unit 120 to build an object model for the corresponding object or type of object. The drone 122 and/or the control unit 120 may, for example, refer to the object models to recognize objects in the building 110 during an investigation and/or to determine an issue with an object.

As an example, if the object observed during the latest inspection of the building 110 diverges more than a threshold percent in one or more metrics (e.g., location, dimensions, color, light reflectance, edge uniformity, etc.) from the model, then the drone 122 or the control unit 120 may determine that there is an issue with the object (e.g., damaged, dirty, wrong location, etc.).

The one or more data objects can include data objects that specify requirements or recommendations for the property or for particular portions of the property. These requirements or recommendations can be for particular types of spaces of the property and/or particular elements of the property. For example, the one or more data objects can include all or a portion of the ADA compliance code. In more detail, when the drone 122 is inspecting a bathroom of the property, is approaching the bathroom of the property, or is scheduled to inspect the bathroom of the property, the system 100 may retrieve a section of the ADA code relevant to bathrooms. The drone 122 can inspect the bathroom to ensure that the requirements in this section of the ADA code are being met, or, if not being met, identify what bathroom elements of the property are failing to meet the code.

The requirements or recommendations for an element may be absolute or relative to one or more other elements. Continuing the earlier example, the code may provide that a range of acceptable heights for a toilet grab handle, measured from the floor of the bathroom to the top of a toilet grab handle, is between 33" and 36". The code may also provide that the toilet paper dispenser must be between 7" and 9" from the toilet. The code can further specify that the toilet paper dispenser cannot be larger than 33" in length.

Other examples of data objects that specify requirements or recommendation for the property or for particular portions of the property can include building codes (e.g., local building codes, state building codes, federal building codes, etc.), building recommendations by independent organizations (e.g., building recommendations for different space types by the National Institute of Building Sciences), government health codes or recommendations (e.g., Center for Disease Control and Prevention's design recommendations for ventilation in buildings), etc.

The process 300 includes obtaining sensor data of the property using a drone that has one or more sensors (304). For example, as shown in FIG. 1, the drone 122 may obtain sensor data using its onboard sensors, such as image data from its camera 124, moisture data from one or more moisture sensors, laser light data from one or more photoelectric sensors, etc. This sensor data that the drone 122 obtains using its onboard sensors may be compiled during an inspection to generate the collected sensor data 132. The drone 122 itself may compile the data. Alternatively, the drone 122 may transmit the sensor data to the control unit 120, e.g., while the data is collected by the drone 122 or after the inspection of the building 110, and the control unit 120 may compile the sensor data to generate the collected sensor data 132.

In some implementations, additional sensor data may be obtained from one or more other sensors. For example, the control unit 120 may collect image data from one or more cameras installed on the property and supplement the images collected by the drone 122 to generate the collected sensor data 132.

The process 300 includes, generating a map from the sensor data (306). For example, as shown in FIG. 1, the drone 122 may use the collected sensor data 132 to generate the map 136. Alternatively, the control unit 120 can generate the map 136 using sensor data collected by the drone 122 during the inspection of the building 110. The map 136 may be a three-dimensional map, such as a 3D image map (e.g., 360° image map), a LiDar map, or a map generated using a 3D mesh based on the collected sensor data. For example, the laser scan data collected by the drone 122 may be used to generate a 3D mesh for the interior of the building 110. The drone 122 or the control unit 120 can proceed to overlay the 3D mesh with images (e.g., photospheres, panoramas, or other 360° or wide angle images) collected using the camera 124 to generate a 3D image map for the interior of the building 110. The drone 122 may use various imaging techniques such as SLAM to generate the map 136.

In some implementations, the process 300 includes generating or updating one or more computer models for elements of the property using the sensor data. In more detail, the control unit 120 can generate a 2D or 3D image for different elements of the building 110 identified from the collected sensor data 132. For example, the control unit 120 can use object recognition techniques to identify particular types of elements in the building 110 during the inspection of the building 110 by the drone 122, such as electrical outlets, smoke detector, carbon monoxide detector, windows, sinks, registers, ducts, toilets, toilet paper dispensers, bath tubs, showers, walls, stairs, etc.

The computer models updated or generated for elements of the property can depend on the type of inspection being performed by the drone 122. As an example, the inspection scheduled for the drone 122 may be for particular room types of the building 110, such as the bathrooms of the building 110. Based on this, the one or more data objects that the drone 122 or the control unit 120 obtain can include computer models for elements expected to be found in the bathroom type rooms, such as toilets, toilet paper dispensers, showers, sinks, bathtubs, air registers, etc. Additionally or alternatively, the drone 122 may use particular object recognition software that has been trained or programmed for identifying elements of a bathroom or the particular elements anticipated to be found in the bathrooms of the building 110 (e.g., based on design for the bathrooms of the building 110 and/or based on code requirements for bathrooms).

As another example, the inspection of the building 110 by the drone 122 can be based on a particular constructions schedule or milestone schedule for the building 110. For example, a first inspection of the building 110 by the drone 122 may be scheduled at the second month of construction of the building 110 when the door openings, window openings, walls, and stairs are expected to be complete. During this inspection, the one or more data objects accessed can include portions of building code relevant to windows, door openings, hall ways, and stairs such as door opening width and height, window height with respect to the floor, hall way width, stair step minimum height, maximum height, and height consistency requirements (e.g., stair steps must have a consistent height with respect to the other stair steps within a threshold distance such as 1", 0.5", or 0.25" to determine whether the stairs include a dangerous stumble step). The sensor data obtained by the drone 122 can include, for example, images of the walls, door openings, stairs, windows, etc. As will be described in more detail below, the control unit 120 can use these images and the portions of the building code to identify issues with the building 110 such as the windows or window openings being too low with respect to the floor (e.g., less than 24" from the window opening to the floor).

Continuing this example, a second inspection of the building 110 by the drone 122 may be scheduled a month after the first inspection when the HVAC system is anticipated to be installed in the building 110. During this inspection, the drone 122 may focus its inspection of the building 110 on HVAC elements, such as register locations, duct locations, etc.

Various other inspections may be scheduled for the building 110 after the building 110 is constructed, e.g., for maintenance or for determining if maintenance is needed based on identified damage. For example, the drone 122 may be scheduled to inspect the roof of the building 110 every 2 years to collect sensor data that may indicate a condition of the roof slates/tiles/shingles and/or to identify any missing slates/tiles/shingles. If, during one of these inspections, the drone 122 identifies a missing roof tile or a damaged roof tile, the drone 122 may notify the control unit 120 of the damage to the roof. This notification may provide a general indication that the roof is damaged. However, the notification can include additional or alternative information. For example, the drone 122 may provide an indication of the specific roof tile that is missing or damaged, such as by highlighting or otherwise accentuating the specific roof tile on a model for the roof of the building 110. In response to receiving this notification, the control unit 120 can schedule a repair job for the roof, notify a repairman of the roof damage, notify an owner or occupant of the building 110 of the damage, or a combination thereof.

In some implementations, the inspection of the property by the drone is initiated in response to particular events. For example, the drone 122 may inspect the building 110 or a portion of the building 110 based on an inspection schedule. However, the drone 122 may inspect the building 110 or a portion of the building 110 in response to other triggering events. For example, in response to receiving a notification indicating that a new tenant is moving in and/or a new tenant has moved out, the control unit 120 may schedule an inspection of the building 110.

In the example of a new tenant, the sensor data collected during the inspection may be used to determine the state of the building 110 at a time of move-in, such as an indication of what elements of the building 110 are damaged or in need of repair. Based on the results of the inspection, the control unit 120 may schedule maintenance repair of one or more elements of the property. The control unit 120 can additionally or alternatively save the state of the property, which can include for example an indication of the condition of each element in the property or a particular set of elements in the property (e.g., those elements that are typically damaged by tenants such as walls, appliances, ceiling fans, windows, etc.), for comparison with the results of an inspection performed by the drone 122 after the tenant moves out.

The process 300 includes identifying an issue with the property by comparing the map with the one or more data objects (308). For example, as described above with respect to FIG. 1, the drone 122 or the control unit 120 may compare the map 136 with the plan 130 to determine that the actual dimensions of the building 110 or an area inside the building 110 do not match or fail to substantially match the dimensions indicated in the plan 130.

As another example, the drone 122 or the control unit 120 may compare a portion of the map for a particular element and compare that portion to information accessed for that element or that type of element. In more detail, the control unit 120 can compare of a portion of the map that represents a window frame to previous images of the window frame to determine that the window frame is damaged or dirty. Similarly, the control unit 120 can compare a portion of the map that represents a bathroom sink to a computer model for the bathroom sink to determine that the sink has been damaged.

As another example, the drone 122 or the control unit 120 may use the map to determine if one or more accessed rules for the building 110 or for a particular portion of the building 110 are met. For example, the control unit 120 can access a subset of building codes relevant to doors and hallways that requires hallways to be at least 36" in width and door frames to be at least 33" in width. The control unit 120 can use the map to determine whether the hallways and the door frames of the building 110 meet the relevant building codes, and, in the process, determining if there are any issues with the building 110. For example, if one doorway is 32" wide, the control unit 120 can generate a warning that indicates that there is a problem with an element of the building 110, that indicates that there is door frame that is too narrow, and/or that identifies the particular door frame that is too narrow.

The control unit 120 may proceed to generate a notification as described in more detail below or schedule a construction job to correct the particular door frame.

The issue can be identified by the drone 122 or by the control unit 120. In some cases, the drone 122 may identify a potential issue and the control unit 120 can perform a more thorough analysis to verify that the issue exists or to determine that there is no issue. The identified issue can be that an element of the building 110—such as structural element, electrical equipment, appliances, HVAC system components, etc.—is damaged or requires maintenance. The identified issue can be that the dimensions of an element of the building 110 do not match or are not within a threshold value or percent of expected dimensions for the element. The identified issue can be that the location of an element of the building 110 is not within a permissible zone for the element or an exact location required for the element. For example, the element may be too close to one or more other elements of the building 110 or too far away from one or more other elements of the property. In more detail, the drone 122 may determine that there is an issue if it determines that the toilet paper dispenser is greater than 9" from the toilet or less than 7" from the toilet in violation of accessed ADA code.

In some implementations, identifying an issue with the property by comparing the map with the one or more data objects includes: identifying, from the one or more data objects, specified measurements for at least a portion of the property; identifying, from the map, observed measurements for the at least portion of the property; and determining that one or more of the observed measurements conflicts with one or more corresponding specified measurements of the specified measurements, and generating the notification includes generating a notification indicating that there is a conflict between (i) the one or more data objects and the map, (ii) the specified measurements and the observed measurements for the at least portion of the property, or (iii) the one or more observed measurements and the one or more corresponding specified measurements. For example, the control unit 120 may compare the map of the building 110 with a floor plan for the building 110 to determine that the hallways constructed in the building 110 are 3" narrower than what the floor plan called for. The control unit 120 can proceed to generate a notification that provides there is an issue with the particular hallway due to the hallway being 3" narrower than what the floor plan called for. The control unit 120 may request a response from a user, such as confirmation to create a work order to correct the hallway width.

In some implementations, determining that the one or more observed measurements conflicts with the one or more corresponding specified measurements includes determining that the one or more observed measurements do not match the one or more corresponding specified measurements. For example, the drone 122 can determine that the hallway width of 33" does not match the floorplan hallway width of 36".

In some implementations, determining that the one or more observed measurements conflicts with the one or more corresponding specified measurements includes determining that the one or more observed measurements deviates by at least a threshold value or a threshold percentage from the one or more corresponding specified measurements. For example, the drone 122 can determine that there is an issue due the observed hallway width of 33" being greater than a 5% deviation from the floorplan hallway width of 36".

In some implementations, determining that the one or more observed measurements conflicts with the one or more corresponding specified measurements includes: determining, from the map, a location of an element of the property;

identifying, from the one or more data objects, a specified location for the element or a permissible region for the element; and determining that the location differs from the specified location or that the location is not in the permissible region. For example, the drone 122 may use the ADA codes to identify permissible regions for a toilet paper dispenser with respect to a toilet, or a required location for the toilet paper dispenser with respect to the toilet. For example, the ADA codes may provide that the toilet paper dispenser must be 7" to 9" from the toilet. If the drone 122 determines that the identified location for the toilet paper dispenser is not within one of these regions or is not in the required location, the drone 122 may generate a warning indicating that there is an issue with the location of the toilet paper dispenser.

The process 300 includes generating a notification that includes an indication of the issue (310). The control unit 120 or the drone 122 can generate the notification based on the issue with the property. For example, as described above with respect to FIG. 1, the drone 122 or the control unit 120 may generate a notification such as a report that includes information relevant to the inspection performed by the drone 122. This information may include, for example, indications of issues that were detected during the inspection, e.g., by comparing the plan 130 to the map 136. As an example, the drone 122 may generate a report once it has completed its inspection of the building 110 and may send the report to the client device 104. The report may include an indication that a particular wall of the building 110 is displaced by three inches with respect to a planned location for the wall per a floor plan for the building 110.

The notification can identify the one or more elements that are associated with the issue. For example, if the control unit 120 determines that the toilet paper dispenser is too far away from the toilet, the control unit 120 can generate a notification that includes an indication of the particular toilet paper dispenser and/or the particular toilet of the building 110. The notification can provide additional information such as the location of the element(s) (e.g., coordinates), identifications for the elements (e.g., ID number or name assigned to the element(s) in a floor plan or a computer model for the building 110), an indication of the rooms that the element(s) is located in (e.g., ID number for the room, indication of the type of room, location of the room, etc.), etc.

The notification can identify the type of issue and the associated elements. Continuing the example, the notification can include an indication that an ADA code is violated based on the distance between the toilet paper dispenser and the toilet in Bathroom 1 on the first floor of the building 110.

The process 300 includes transmitting the report to a computing device of a user (312). For example, as described above with respect to FIG. 1, the drone 122 or the control unit 120 may transmit the report 138 to the client device 104 of the client 102. The report 138 may be transmitted over a wireless network, such as, for example, a cellular network.

In some implementations, the process 300 includes determining a space type for a particular portion of the property. For example, the drone 122 may, during the inspection of the building 110, determine a space type for a particular area of the building 110 based on the particular elements of the building 110 identified by the drone 122. Here, accessing the one or more data objects that specify one or more requirements for the property can include accessing a data object that specifies one or more requirements applicable to the space type for the particular portion of the property in response to determining the space type, and identifying the issue with the property can include determining that a requirement of the one or more requirements applicable to the space type is not met.

As an example, the control unit 120 may access a list of code requirements applicable to bathrooms in response to the drone 122 detecting one or more bathroom elements, such as a toilet, a toilet paper dispenser, a bathtub, a shower, a sink, etc. The control unit 120 may provide the list of code requirements to the drone 122 which can proceed to collect additional sensor data to determine if the bathroom of the building 110 meets the list of code requirements. For example, after identifying a bathtub, the drone 122 may request code requirements for bathrooms from the control unit 120. The control unit 120 may reply with the code requirements that provide that the toilet paper dispenser must be within 7" to 9" from the toilet. The drone 122 may then position itself and/or its camera 124 towards the toilet and toilet paper dispenser (e.g., from one or more poses or positions) and use the collected data to determine the distance of the toilet paper dispenser from the toilet. In response to determining that the distance is 5.5", the drone 122 may transmit a notification to the control unit 120 indicating that an issue is detected and/or that the bathroom code requirements are not met.

In some implementations, determining that the requirement applicable to the space type is not met includes accessing a portion of the map that represents the particular portion of the property; and determining, from the portion of the map, that the requirement applicable to the space requirement is not met. For example, in determining whether the ADA codes for a bathroom are met, the control unit 120 can access a portion of the map that represents Bathroom 1 on the first floor of the building 110. The control unit 120 can determine from the map that the bathroom sink has a height of 40" with respect to the floor, in violation of ADA code.

In some implementations, determining the space type for the particular portion of the property includes using a subset of the sensor data to identify a space type for the particular portion of the property. For example, the drone 122 can perform object recognition techniques on images collected by the camera 124 in a particular area of the property to identify particular elements in the area or particular types of elements in the area. In more detail, in response to detecting a bed, a dresser, and/or a ceiling fan from images collected in the area of the building 110 that of the building 110, the drone 122 can determine that the area is a bedroom. As another example, the drone 122 may access a floor plan for the building 110 and, based on its current or past location determined from GPS sensor data, inertial navigation based on gyroscope and accelerometer data, and/or inertial sensors, or landmark identification, identify the area in the floor plan where the drone 122 is or was when other sensor data was collected.

In some implementations, the process 300 includes entering, by the drone, the particular portion of the property that the drone has not previously identified a space type for, where obtaining the sensor data of the property includes obtaining sensor data of the particular portion of the property; and identifying, by the drone and from the sensor data of the particular portion of the property, a set of elements of the particular portion of the property, where determining the space type for the particular portion of the property comprises determining a space type for the particular portion of the property using the set of elements. For example, the drone 122 may enter an area of the building 110 that it has not inspected yet. The drone 122 may proceed to collect sensor data of the area using its onboard sensors and attempt to recognize property elements in the area using the sensor data. For example, the drone 122 may apply a machine learning algorithm for object recognition on a set of images collected by the drone 122 while in the area of the building 110. Based on the property elements identified or the types of property elements identified as a result of applying the algorithm, the drone 122 can classify the area as a particular space type that always or typically includes those elements, or is known to include those elements based on a design of the building 110.

As an example, the drone 122 or the control unit 120 can determine a space type in this way by comparing one or more recognized elements to one or more lists of elements (e.g., where each list is for a particular space type). As another example, the drone 122 or the control unit 120 can determine a space type in this way by providing information on the identified elements as input to a computer model such as a machine learning algorithm that has been trained to identify space types based on the type of elements and/or number of each type of element identified in a particular area. The output of the computer model may be a numerical value. The control unit 120 can compare to the numerical values to different ranges of values that each represent a particular space type, to identify the range that contains the numerical value and, therefore, the particular space type for the area of the building 110.

In identifying the set of elements of the particular portion of the building 110, the drone 122 can attempt to a set of elements that are easier to identify. The elements in the set of elements may be easier to identify based on their size, based on their edges being more defined, based on their shapes or dimensions being dissimilar from other elements, based on their surfaces having sufficiently low or high reflection, etc. For example, a ceiling fan element may be included in the set of elements over an electrical outlet element due to the size of the ceiling fan element being larger than that of the electrical outlet element and due to the ceiling fan element having a more distinct shape than that of the electrical outlet element which the drone 122 may more easily confuse with other elements such as a cable outlet element or a switch element. Additionally or alternatively, the elements in the set of elements may be more indicative of a particular space type. For example, a bath tub element may be included in the set of elements over a sink element because the bath tub element would be more indicative of an area being a bathroom space type than a sink since a sink may also be found in a kitchen or laundry room space types. The drone 122 may perform object recognition on images collected in the area using one or more machine learning algorithms trained to particularly identify the elements in the set of elements.

In some implementations, the process 300 includes, based on the space type for the particular portion of the property, identifying a set of prioritized elements that correspond to the one or more requirements. For example, the accessed data objects may include building codes for bathrooms. The control unit 120 may determine the prioritized elements for the bathroom space type using the building codes for bathrooms. For example, if the building codes provide that bathroom sinks have to be between 28" and 35" in height and that the toilet and the toilet paper dispenser must be within 7" to 9" of the toilet, the control unit 120 can determine that the sink, the toilet, and the toilet paper dispenser are prioritized elements for the bathroom space type.

Obtaining the sensor data of the property can include obtaining, by the drone 122, additional sensor data of the particular portion of the property, the additional sensor data revealing at least one of (i) additional information of the elements in the set of prioritized elements, (ii) relationship information between at least one element in the set of prioritized elements and one or more other elements of the particular portion of the property, and (iii) that at least one element in the set of prioritized elements is not present in the particular portion of the property. Continuing the earlier example, after determining that the area of the building 110 is a bathroom space type, the drone 122 may collect additional sensor of those prioritized elements. For example, the drone 122 may position itself to obtain image data using its camera 124 of the toilet, the toilet paper dispenser, and the sink.

Generating the map from the sensor data can include generating a map of the particular portion of the property using the additional sensor data. For example, the control unit 120 can generate the map using the additional data by generating a new map using the additional sensor data and the previously obtained sensor data or by updating a map created using the previously obtained sensor data.

Determining that the requirement of the one or more requirements applicable to the space type is not met can include determining, using the map of the particular portion of the property, that a prioritized element of the set of prioritized elements does not meet a requirement applicable to the prioritized element. For example, after updating a map for the bathroom of the building 110, the control unit 120 can use the map to determine that the sink has a height of 40" with respect to the floor in violation of the code requirements for the bathroom sink.

In some implementations, the process 300 includes retrieving one or more computer models for the elements in the set of prioritized elements, where the one or more data objects include the one or more computer models. For example, the control unit may obtain a computer model for a toilet, a computer model for the toilet paper dispenser, and a computer model for the sink. These computer models may be models for the actual elements, e.g., previously generated using sensor data previously obtained by the drone 122. Alternatively, these computer models may be models for the type of elements found in the prioritized elements, such as generic computer models or computer models for particular element manufacturer models.

Obtaining the additional sensor data can include using a computer model of the one or more computer models corresponding to the prioritized element to detect the prioritized element in the particular portion of the property; and obtaining, using the one or more sensors of the drone, sensor data of at least one of (i) an area where the prioritized element was detected and (ii) an area immediately surrounding an area where the prioritized element was detected. For example, the drone 122 may use its onboard sensors to scan the area of the building 110 to identify an element in the set of elements. In response to detecting one of the elements, the drone 122 may reposition itself or its onboard sensors to take acquire additional sensor data of the particular element and/or of the area immediately around the particular element. Generating the map of the particular portion of the property can include generating the map of the particular portion of the property using the sensor data of at least one of (i) the area where the prioritized element was detected and (ii) the area immediately surrounding the area where the prioritized element was detected. For example, the control unit 120 can use the additional sensor data to update a previously generated map for the area. In more detail, the control unit 120 may generate a 3D mesh using LiDar data acquired by the drone 122 in the area. After detecting a prioritized element such as a sink in the area, the drone 122 may acquire images of the sink and the area surrounding the sink. The control unit 120 may receive these images and apply them to the 3D mesh (e.g., based on position data of the drone 122 and/or the camera 124 when the images were taken) to generate a 3D image for the sink.

In some implementations, the process 300 includes retrieving one or more computer models for the elements in the set of prioritized elements, where the one or more data objects include the one or more computer models, where obtaining the additional sensor data includes using a computer model of the one or more computer models corresponding to the prioritized element to detect the prioritized element in the particular portion of the property; and obtaining, using the one or more sensors of the drone, sensor data of at least one of (i) an area where the prioritized element was detected and (ii) an area immediately surrounding an area where the prioritized element was detected, and where generating the map of the particular portion of the property includes generating the map of the particular portion of the property using the sensor data of at least one of (i) the area where the prioritized element was detected and (ii) the area immediately surrounding the area where the prioritized element was detected. For example, the control unit 120 may retrieve a computer model for a bathroom sink after receiving an indication from the drone 122 that the area of the building 110 is a bathroom space type. The control unit 120 may then provide the computer model of the bathroom sink to the drone 122 which can use the model to identify the sink in the area and/or determine a condition of the sink the area (e.g., whether it is damaged, discolored, etc.).

In some implementations, the process 300 includes detecting the prioritized element from the sensor data of the particular portion of the property by using a machine learning algorithm, where obtaining the additional sensor data includes obtaining, using the one or more sensors of the drone, sensor data of at least one of (i) an area where the prioritized element was detected and (ii) an area immediately surrounding an area where the prioritized element was detected, and where generating the map of the particular portion of the property includes generating the map of the particular portion of the property using the sensor data of at least one of (i) the area where the prioritized element was detected and (ii) the area immediately surrounding the area where the prioritized element was detected. For example, the drone 122 may perform object recognition on images (or other sensor data) obtained in the area of the building 110 using a machine learning algorithm that is particular to a specific element in the set of prioritized elements or to prioritized elements for the specific space type.

In some implementations, the process 300 includes using the one or more requirements to determine areas in the particular portion of the property where the elements in the set of prioritized elements are expected to be located, where obtaining the additional sensor data while the drone is located in the particular portion of the property includes obtaining, using the one or more sensors of the drone, sensor data of the areas where the elements of the set of prioritized elements are expected to be located, and where generating the map of the particular portion of the property includes generating the map of the particular portion of the property using the sensor data of the areas where the elements of the set of prioritized elements are expected to be located. For example, based on accessed portion of the building code providing that the toilet paper dispenser must be between 7" and 9" from the toilet and the toilet paper dispenser being an element in the prioritized elements, the drone 122 may determine all regions that are 7" to 9" from the toilet and proceed to (i) position itself and/or its camera 124 such that the field of view of the camera 124 contains at least one of the regions that is 7" to 9" from the toilet and (ii) capture image data of the at least one region.

The drone 122 may continue to reposition itself or the camera 124 to capture image data (or other sensor data) of other regions until image data is obtained for all possible regions. Alternatively, after capturing image data of one of the regions, the drone 122 may perform image recognition to determine if the toilet paper dispenser is located in the region. If the drone 122 cannot identify the prioritized element, it may proceed to move on to the next region possibly containing the prioritized element and capture sensor data of that region. The drone 122 may continue this process until sensor data is obtained for all the regions or until the prioritized element is identified in one of the regions. If the prioritized element is not identified after sensor data for all regions is obtained and analyzed to identify the prioritized element, the drone 122 may generate a warning notification indicating that the prioritized element is missing or not located in a permissible region.

In some implementations, the process 300 includes determining that a plan for the property is not available; and in response to determining that the plan for the property is not available, performing, by the drone, a survey of each unique space of the property that is accessible to the drone. Obtaining the sensor data of the property can include obtaining sensor data of each of the unique spaces of the property during the survey using the one or more sensors of the drone. For example, the drone 122 may capture LiDar data and image data of each area of the building 110 upon determining that there is no floor plan for the building 110 and/or a map has not previously been generated for the building 110. In performing the survey, the drone 122 can track its location using a GPS sensor, through inertial navigation, through landmark identification, or through a combination of GPS, inertial navigation, and/or landmark navigation.

In some implementations, the process 300 includes initiating a survey of at least a portion of the property using the drone in response to a triggering event, where accessing the one or more data objects includes accessing one or more data objects that correspond to a type of triggering event that the triggering event belongs to, where obtaining the sensor data comprises obtaining the sensor data during the survey of the at least portion of the property, and where generating the map comprises generating a map that includes observed elements of the at least portion of the property corresponding to the type of triggering event. For example, the drone 122 or the control unit 120 may initiate the survey in response to detecting a noise greater than a threshold decibel level and/or detecting a noise that is indicative of an element being damaged or breaking (e.g., shattering glass). In more detail, if the control unit 120 detects a noise that it identifies as glass breaking based on a comparison to accessed noise samples, the control unit 120 can instruct the drone 122 to turn on and perform a survey of all the windows in the building 110.

In some implementations, the process 300 includes initiating an inspection of the property for damage to one or more elements of the property using the drone, wherein obtaining the sensor data comprises obtaining sensor data of the one or more elements during the inspection of the property; detecting, from at least a portion of the sensor data of the one or more elements, an element of the one or more elements; and in response to detecting the element, accessing a computer model for the element, wherein the one or more data objects include the computer model. Generating the map can include generating an observed model for the element. Identifying the issue with the property can include determining that at least a portion of the observed model deviates from the computer model of the element. Generating the notification can include generating a notification that includes an indication that the element is damaged. For example, the drone 122 may initiate inspection of window elements of the building 110. The drone 122 may acquire a computer model for a window that is indicative of an undamaged window. The drone 122 may compare the sensor data it obtains of the windows to the computer model for the window to identify damage to the window elements, such as cracks in the window elements, missing panes in the window elements, holes in the window elements, etc.

In some implementations, accessing the one or more data objects includes accessing a template that specifies safety requirements for the property; identifying an issue with the property by comparing the map with the one or more data objects comprises determining, from the map, that at least one of the safety requirements for the property is not met; and generating the notification comprises generating a notification indicating that the at least one safety requirement is not met. For example, the template may provide that the building 110 must include at least four smoke detectors and two carbon monoxide detectors. After generating the map, the control unit 120 may determine from the map that the building 110 only includes three smoke detectors. In response, the control unit 120 can generate a notification indicating that an additional smoke detector must be installed in the building 110 and/or schedule a work order to install the smoke detector.

In some implementations, accessing the template that specifies safety requirements includes accessing a template that specifies a height requirement for one or more particular elements of the property; and determining that the at least one safety requirement for the property is not met includes determining, from the map, that an element of the one or more particular elements has at least one of a (i) position and (ii) size that does not meet the height requirement. For example, the template may require that the ceilings of the building 110 be at least 7' tall. The control unit 120 may determine from the map that the ceilings for the building 110 in a first area are only 6.5' tall and, in response, generate a notification indicating that there is safety issue due to the ceiling height in the first area of the building 110. As another example, the safety requirements may specify a minimum height of 6" for electrical outlets with respect to the floor of the building 110. The control unit 120 may use the map to identify one or more electrical outlets below the 6" minimum height and, in response, generating a notification to raise attention of the issue and/or scheduling a work order to fix the heights of these specific outlets.

In some implementations, accessing the template that specifies safety requirements includes accessing a template that specifies a minimum number of one or more particular elements for at least a portion of the property; and determining that the at least one safety requirement for the property is not met includes determining, from the map, that a number of the one or more particular objects in the at least portion of the property is less than the minimum number. For example, the template may provide that the building 110 must include at least one window in each bedroom. After generating the map, the control unit 120 may determine from map that a window was never added to the guest bedroom of the building 110. In response, the control unit 120 can generate a notification indicating that an additional window must be installed in the guest bedroom and/or schedule a work order to install the window in the guest bedroom.

In some implementations, accessing the template that specifies safety requirements includes accessing a template that specifies a size requirement for one or more particular elements of the property; and determining that the at least one safety requirement for the property is not met includes determining, from the map, that observed measurements for an element of the one or more particular elements indicate that the element does not meet the size requirement. For example, the template may provide that the door frames must be at least 33" wide. The control unit 120 may determine from the map that a door frame leading to the bathroom is only 30" wide and, in response, generate a notification indicating an issue with the bathroom door frame due to it being too narrow.

In some implementations, accessing the template that specifies safety requirements includes accessing a template that specifies a location requirement for one or more particular elements of the property; and determining that the at least one safety requirement for the property is not met includes determining, from the map, a location for an element of the one or more particular elements that indicates that the element does not meet the location requirement. For example, the template may require that a smoke detector be located on each floor of the building 110. The control unit 120 may use the map to determine that no smoke detector was installed on the second floor of the building 110 and, in response, generate a notification that indicates there is a safety issue for there being a lack of a smoke detector on the second floor and/or schedule a work order to install a smoke detector on the second floor of the building 110.

Figure 4:
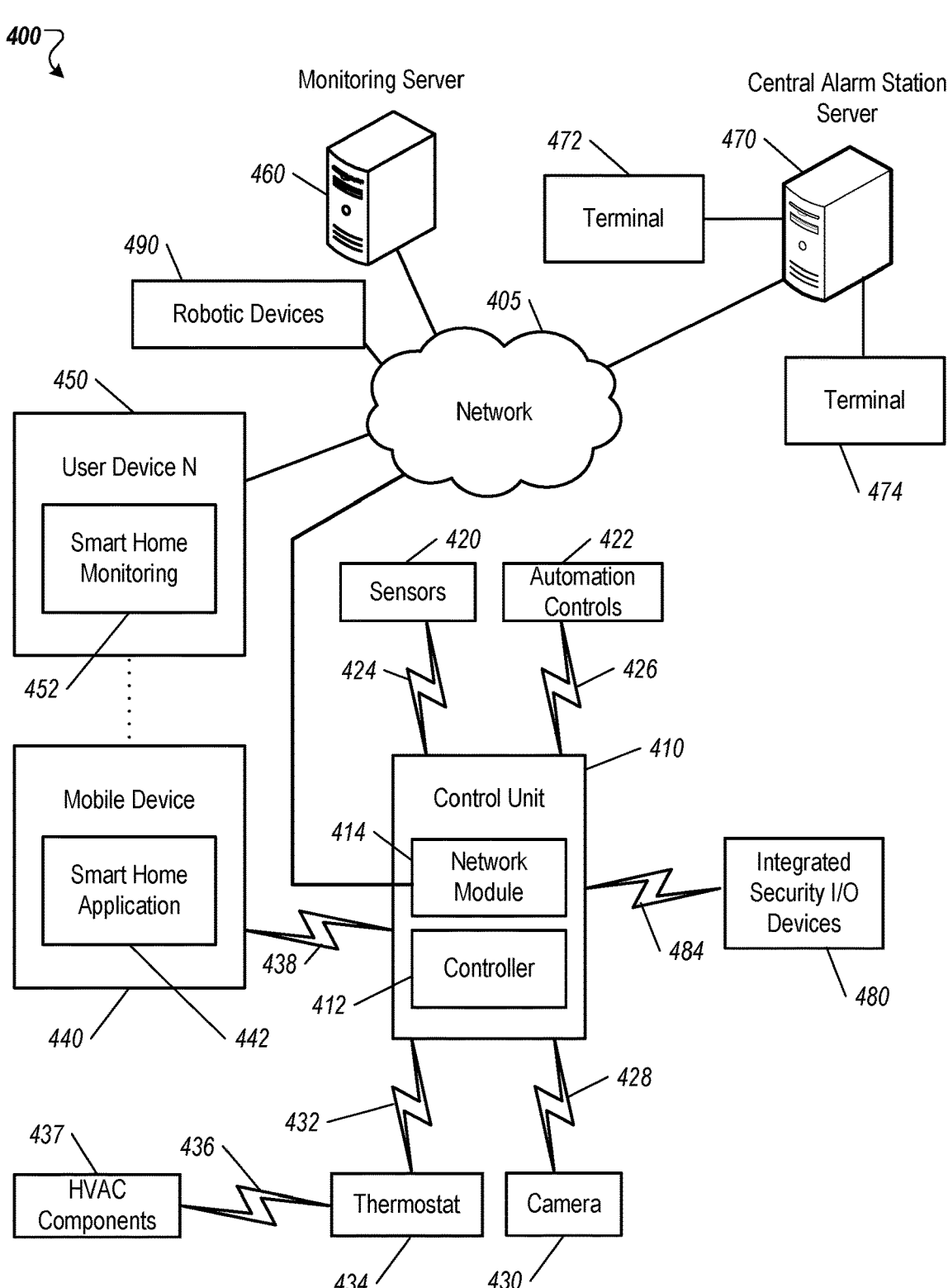
FIG. 4 is a block diagram illustrating an example security monitoring system.

FIG. 4 is a diagram illustrating an example of a home monitoring system 400. The monitoring system 400 includes a network 405, a control unit 410, one or more user devices 440 and 450, a monitoring server 460, and a central alarm station server 470. In some examples, the network 405 facilitates communications between the control unit 410, the one or more user devices 440 and 450, the monitoring server 460, and the central alarm station server 470.

The network 405 is configured to enable exchange of electronic communications between devices connected to the network 405. For example, the network 405 may be configured to enable exchange of electronic communications between the control unit 410, the one or more user devices 440 and 450, the monitoring server 460, and the central alarm station server 470. The network 405 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 405 may include multiple networks or subnetworks, each of which may include, for example, a wired or wireless data pathway. The network 405 may include a circuit-switched network, a packet-switched data network, or any other network able to carry electronic communications (e.g., data or voice communications). For example, the network 405 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 405 may include one or more networks that include wireless data channels and wireless voice channels. The network 405 may be a wireless network, a broadband network, or a combination of networks including a wireless network and a broadband network.

The control unit 410 includes a controller 412 and a network module 414. The controller 412 is configured to control a control unit monitoring system (e.g., a control unit system) that includes the control unit 410. In some examples, the controller 412 may include a processor or other control circuitry configured to execute instructions of a program that controls operation of a control unit system. In these examples, the controller 412 may be configured to receive input from sensors, flow meters, or other devices included in the control unit system and control operations of devices included in the household (e.g., speakers, lights, doors, etc.). For example, the controller 412 may be configured to control operation of the network module 414 included in the control unit 410.

The network module 414 is a communication device configured to exchange communications over the network 405. The network module 414 may be a wireless communication module configured to exchange wireless communications over the network 405. For example, the network module 414 may be a wireless communication device configured to exchange communications over a wireless data channel and a wireless voice channel. In this example, the network module 414 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 414 also may be a wired communication module configured to exchange communications over the network 405 using a wired connection. For instance, the network module 414 may be a modem, a network interface card, or another type of network interface device. The network module 414 may be an Ethernet network card configured to enable the control unit 410 to communicate over a local area network and/or the Internet. The network module 414 also may be a voice band modem configured to enable the alarm panel to communicate over the telephone lines of Plain Old Telephone Systems (POTS).

The control unit system that includes the control unit 410 includes one or more sensors. For example, the monitoring system may include multiple sensors 420. The sensors 420 may include a lock sensor, a contact sensor, a motion sensor, or any other type of sensor included in a control unit system. The sensors 420 also may include an environmental sensor, such as a temperature sensor, a water sensor, a rain sensor, a wind sensor, a light sensor, a smoke detector, a carbon monoxide detector, an air quality sensor, etc. The sensors 420 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 420 can also include a radio-frequency identification (RFID) sensor that identifies a particular article that includes a pre-assigned RFID tag.

The control unit 410 communicates with the home automation controls 422 and a camera 430 to perform monitoring. The home automation controls 422 are connected to one or more devices that enable automation of actions in the home. For instance, the home automation controls 422 may be connected to one or more lighting systems and may be configured to control operation of the one or more lighting systems. In addition, the home automation controls 422 may be connected to one or more electronic locks at the home and may be configured to control operation of the one or more electronic locks (e.g., control Z-Wave locks using wireless communications in the Z-Wave protocol). Further, the home automation controls 422 may be connected to one or more appliances at the home and may be configured to control operation of the one or more appliances. The home automation controls 422 may include multiple modules that are each specific to the type of device being controlled in an automated manner. The home automation controls 422 may control the one or more devices based on commands received from the control unit 410. For instance, the home automation controls 422 may cause a lighting system to illuminate an area to provide a better image of the area when captured by a camera 430.

The camera 430 may be a video/photographic camera or other type of optical sensing device configured to capture images. For instance, the camera 430 may be configured to capture images of an area within a building or home monitored by the control unit 410. The camera 430 may be configured to capture single, static images of the area and also video images of the area in which multiple images of the area are captured at a relatively high frequency (e.g., thirty images per second). The camera 430 may be controlled based on commands received from the control unit 410.

The camera 430 may be triggered by several different types of techniques. For instance, a Passive Infra-Red (PIR) motion sensor may be built into the camera 430 and used to trigger the camera 430 to capture one or more images when motion is detected. The camera 430 also may include a microwave motion sensor built into the camera and used to trigger the camera 430 to capture one or more images when motion is detected. The camera 430 may have a "normally open" or "normally closed" digital input that can trigger capture of one or more images when external sensors (e.g., the sensors 420, PIR, door/window, etc.) detect motion or other events. In some implementations, the camera 430 receives a command to capture an image when external devices detect motion or another potential alarm event. The camera 430 may receive the command from the controller 412 or directly from one of the sensors 420.

In some examples, the camera 430 triggers integrated or external illuminators (e.g., Infra-Red, Z-wave controlled "white" lights, lights controlled by the home automation controls 422, etc.) to improve image quality when the scene is dark. An integrated or separate light sensor may be used to determine if illumination is desired and may result in increased image quality.

The camera 430 may be programmed with any combination of time/day schedules, system "arming state", or other variables to determine whether images should be captured or not when triggers occur. The camera 430 may enter a low-power mode when not capturing images. In this case, the camera 430 may wake periodically to check for inbound messages from the controller 412. The camera 430 may be powered by internal, replaceable batteries if located remotely from the control unit 410. The camera 430 may employ a small solar cell to recharge the battery when light is available. Alternatively, the camera 430 may be powered by the controller 412's power supply if the camera 430 is co-located with the controller 412.

In some implementations, the camera 430 communicates directly with the monitoring server 460 over the Internet. In these implementations, image data captured by the camera 430 does not pass through the control unit 410 and the camera 430 receives commands related to operation from the monitoring server 460.

The system 400 also includes thermostat 434 to perform dynamic environmental control at the home. The thermostat 434 is configured to monitor temperature and/or energy consumption of an HVAC system associated with the thermostat 434, and is further configured to provide control of environmental (e.g., temperature) settings. In some implementations, the thermostat 434 can additionally or alternatively receive data relating to activity at a home and/or environmental data at a home, e.g., at various locations indoors and outdoors at the home. The thermostat 434 can directly measure energy consumption of the HVAC system associated with the thermostat, or can estimate energy consumption of the HVAC system associated with the thermostat 434, for example, based on detected usage of one or more components of the HVAC system associated with the thermostat 434. The thermostat 434 can communicate temperature and/or energy monitoring information to or from the control unit 410 and can control the environmental (e.g., temperature) settings based on commands received from the control unit 410.

In some implementations, the thermostat 434 is a dynamically programmable thermostat and can be integrated with the control unit 410. For example, the dynamically programmable thermostat 434 can include the control unit 410, e.g., as an internal component to the dynamically programmable thermostat 434. In addition, the control unit 410 can be a gateway device that communicates with the dynamically programmable thermostat 434. In some implementations, the thermostat 434 is controlled via one or more home automation controls 422.

A module 437 is connected to one or more components of an HVAC system associated with a home, and is configured to control operation of the one or more components of the HVAC system. In some implementations, the module 437 is also configured to monitor energy consumption of the HVAC system components, for example, by directly measuring the energy consumption of the HVAC system components or by estimating the energy usage of the one or more HVAC system components based on detecting usage of components of the HVAC system. The module 437 can communicate energy monitoring information and the state of the HVAC system components to the thermostat 434 and can control the one or more components of the HVAC system based on commands received from the thermostat 434.

In some examples, the system 400 further includes one or more robotic devices 490. The robotic devices 490 may be any type of robots that are capable of moving and taking actions that assist in home monitoring. For example, the robotic devices 490 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 490 may be devices that are intended for other purposes and merely associated with the system 400 for use in appropriate circumstances. For instance, a robotic vacuum cleaner device may be associated with the monitoring system 400 as one of the robotic devices 490 and may be controlled to take action responsive to monitoring system events.

In some examples, the robotic devices 490 automatically navigate within a home. In these examples, the robotic devices 490 include sensors and control processors that guide movement of the robotic devices 490 within the home. For instance, the robotic devices 490 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 490 may include control processors that process output from the various sensors and control the robotic devices 490 to move along a path that reaches the desired destination and avoids obstacles. In this regard, the control processors detect walls or other obstacles in the home and guide movement of the robotic devices 490 in a manner that avoids the walls and other obstacles.

In addition, the robotic devices 490 may store data that describes attributes of the home. For instance, the robotic devices 490 may store a floorplan and/or a three-dimensional model of the home that enables the robotic devices 490 to navigate the home. During initial configuration, the robotic devices 490 may receive the data describing attributes of the home, determine a frame of reference to the data (e.g., a home or reference location in the home), and navigate the home based on the frame of reference and the data describing attributes of the home. Further, initial configuration of the robotic devices 490 also may include learning of one or more navigation patterns in which a user provides input to control the robotic devices 490 to perform a specific navigation action (e.g., fly to an upstairs bedroom and spin around while capturing video and then return to a home charging base). In this regard, the robotic devices 490 may learn and store the navigation patterns such that the robotic devices 490 may automatically repeat the specific navigation actions upon a later request.

In some examples, the robotic devices 490 may include data capture and recording devices. In these examples, the robotic devices 490 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 490 to take and store a biometric sample that can be used to identify the person (e.g., a biometric sample with DNA that can be used for DNA testing).

In some implementations, the robotic devices 490 may include output devices. In these implementations, the robotic devices 490 may include one or more displays, one or more speakers, and/or any type of output devices that allow the robotic devices 490 to communicate information to a nearby user.

The robotic devices 490 also may include a communication module that enables the robotic devices 490 to communicate with the control unit 410, each other, and/or other devices. The communication module may be a wireless communication module that allows the robotic devices 490 to communicate wirelessly. For instance, the communication module may be a Wi-Fi module that enables the robotic devices 490 to communicate over a local wireless network at the home. The communication module further may be a 900 MHz wireless communication module that enables the robotic devices 490 to communicate directly with the control unit 410. Other types of short-range wireless communication protocols, such as Bluetooth, Bluetooth LE, Z-wave, Zigbee, etc., may be used to allow the robotic devices 490 to communicate with other devices in the home. In some implementations, the robotic devices 490 may communicate with each other or with other devices of the system 400 through the network 405.

The robotic devices 490 further may include processor and storage capabilities. The robotic devices 490 may include any suitable processing devices that enable the robotic devices 490 to operate applications and perform the actions described throughout this disclosure. In addition, the robotic devices 490 may include solid-state electronic storage that enables the robotic devices 490 to store applications, configuration data, collected sensor data, and/or any other type of information available to the robotic devices 490.

The robotic devices 490 are associated with one or more charging stations. The charging stations may be located at predefined home base or reference locations in the home. The robotic devices 490 may be configured to navigate to the charging stations after completion of tasks needed to be performed for the monitoring system 400. For instance, after completion of a monitoring operation or upon instruction by the control unit 410, the robotic devices 490 may be configured to automatically fly to and land on one of the charging stations. In this regard, the robotic devices 490 may automatically maintain a fully charged battery in a state in which the robotic devices 490 are ready for use by the monitoring system 400.

The charging stations may be contact based charging stations and/or wireless charging stations. For contact based charging stations, the robotic devices 490 may have readily accessible points of contact that the robotic devices 490 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 490 may charge through a wireless exchange of power. In these cases, the robotic devices 490 need only locate themselves closely enough to the wireless charging stations for the wireless exchange of power to occur. In this regard, the positioning needed to land at a predefined home base or reference location in the home may be less precise than with a contact based charging station. Based on the robotic devices 490 landing at a wireless charging station, the wireless charging station outputs a wireless signal that the robotic devices 490 receive and convert to a power signal that charges a battery maintained on the robotic devices 490.

In some implementations, each of the robotic devices 490 has a corresponding and assigned charging station such that the number of robotic devices 490 equals the number of charging stations. In these implementations, the robotic devices 490 always navigate to the specific charging station assigned to that robotic device. For instance, a first robotic device may always use a first charging station and a second robotic device may always use a second charging station.

In some examples, the robotic devices 490 may share charging stations. For instance, the robotic devices 490 may use one or more community charging stations that are capable of charging multiple robotic devices 490. The community charging station may be configured to charge multiple robotic devices 490 in parallel. The community charging station may be configured to charge multiple robotic devices 490 in serial such that the multiple robotic devices 490 take turns charging and, when fully charged, return to a predefined home base or reference location in the home that is not associated with a charger. The number of community charging stations may be less than the number of robotic devices 490.

In addition, the charging stations may not be assigned to specific robotic devices 490 and may be capable of charging any of the robotic devices 490. In this regard, the robotic devices 490 may use any suitable, unoccupied charging station when not in use. For instance, when one of the robotic devices 490 has completed an operation or is in need of battery charge, the control unit 410 references a stored table of the occupancy status of each charging station and instructs the robotic device to navigate to the nearest charging station that is unoccupied.

The system 400 further includes one or more integrated security devices 480. The one or more integrated security devices may include any type of device used to provide alerts based on received sensor data. For instance, the one or more control units 410 may provide one or more alerts to the one or more integrated security input/output devices 480. Additionally, the one or more control units 410 may receive one or more sensor data from the sensors 420 and determine whether to provide an alert to the one or more integrated security input/output devices 480.

The sensors 420, the home automation controls 422, the camera 430, the thermostat 434, and the integrated security devices 480 may communicate with the controller 412 over communication links 424, 426, 428, 432, 438, and 484. The communication links 424, 426, 428, 432, 438, and 484 may be a wired or wireless data pathway configured to transmit signals from the sensors 420, the home automation controls 422, the camera 430, the thermostat 434, and the integrated security devices 480 to the controller 412. The sensors 420, the home automation controls 422, the camera 430, the thermostat 434, and the integrated security devices 480 may continuously transmit sensed values to the controller 412, periodically transmit sensed values to the controller 412, or transmit sensed values to the controller 412 in response to a change in a sensed value.

The communication links 424, 426, 428, 432, 438, and 484 may include a local network. The sensors 420, the home automation controls 422, the camera 430, the thermostat 434, and the integrated security devices 480, and the controller 412 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Power-line" networks that operate over AC wiring, and a Category 4 (CAT5) or Category 6 (CAT6) wired Ethernet network. The local network may be a mesh network constructed based on the devices connected to the mesh network.

The monitoring server 460 is an electronic device configured to provide monitoring services by exchanging electronic communications with the control unit 410, the one or more user devices 440 and 450, and the central alarm station server 470 over the network 405. For example, the monitoring server 460 may be configured to monitor events generated by the control unit 410. In this example, the monitoring server 460 may exchange electronic communications with the network module 414 included in the control unit 410 to receive information regarding events detected by the control unit 410. The monitoring server 460 also may receive information regarding events from the one or more user devices 440 and 450.

In some examples, the monitoring server 460 may route alert data received from the network module 414 or the one or more user devices 440 and 450 to the central alarm station server 470. For example, the monitoring server 460 may transmit the alert data to the central alarm station server 470 over the network 405.

The monitoring server 460 may store sensor and image data received from the monitoring system and perform analysis of sensor and image data received from the monitoring system. Based on the analysis, the monitoring server 460 may communicate with and control aspects of the control unit 410 or the one or more user devices 440 and 450.

The monitoring server 460 may provide various monitoring services to the system 400. For example, the monitoring server 460 may analyze the sensor, image, and other data to determine an activity pattern of a resident of the home monitored by the system 400. In some implementations, the monitoring server 460 may analyze the data for alarm conditions or may determine and perform actions at the home by issuing commands to one or more of the controls 422, possibly through the control unit 410.

The monitoring server 460 can be configured to provide information (e.g., activity patterns) related to one or more residents of the home monitored by the system 400 (e.g., user 108). For example, one or more of the sensors 420, the home automation controls 422, the camera 430, the thermostat 434, and the integrated security devices 480 can collect data related to a resident including location information (e.g., if the resident is home or is not home) and provide location information to the thermostat 434.

The central alarm station server 470 is an electronic device configured to provide alarm monitoring service by exchanging communications with the control unit 410, the one or more user devices 440 and 450, and the monitoring server 460 over the network 405. For example, the central alarm station server 470 may be configured to monitor alerting events generated by the control unit 410. In this example, the central alarm station server 470 may exchange communications with the network module 414 included in the control unit 410 to receive information regarding alerting events detected by the control unit 410. The central alarm station server 470 also may receive information regarding alerting events from the one or more user devices 440 and 450 and/or the monitoring server 460.

The central alarm station server 470 is connected to multiple terminals 472 and 474. The terminals 472 and 474 may be used by operators to process alerting events. For example, the central alarm station server 470 may route alerting data to the terminals 472 and 474 to enable an operator to process the alerting data. The terminals 472 and 474 may include general-purpose computers (e.g., desktop personal computers, workstations, or laptop computers) that are configured to receive alerting data from a server in the central alarm station server 470 and render a display of information based on the alerting data. For instance, the controller 412 may control the network module 414 to transmit, to the central alarm station server 470, alerting data indicating that a sensor 420 detected motion from a motion sensor via the sensors 420. The central alarm station server 470 may receive the alerting data and route the alerting data to the terminal 472 for processing by an operator associated with the terminal 472. The terminal 472 may render a display to the operator that includes information associated with the alerting event (e.g., the lock sensor data, the motion sensor data, the contact sensor data, etc.) and the operator may handle the alerting event based on the displayed information.

In some implementations, the terminals 472 and 474 may be mobile devices or devices designed for a specific function. Although FIG. 4 illustrates two terminals for brevity, actual implementations may include more (and, perhaps, many more) terminals.

The one or more authorized user devices 440 and 450 are devices that host and display user interfaces. For instance, the user device 440 is a mobile device that hosts or runs one or more native applications (e.g., the home monitoring application 442). The user device 440 may be a cellular phone or a non-cellular locally networked device with a display. The user device 440 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 440 may perform functions unrelated to the monitoring system, such as placing personal telephone calls, playing music, playing video, displaying pictures, browsing the Internet, maintaining an electronic calendar, etc.

The user device 440 includes a home monitoring application 452. The home monitoring application 442 refers to a software/firmware program running on the corresponding mobile device that enables the user interface and features described throughout. The user device 440 may load or install the home monitoring application 442 based on data received over a network or data received from local media. The home monitoring application 442 runs on mobile devices platforms, such as iPhone, iPod touch, Blackberry, Google Android, Windows Mobile, etc. The home monitoring application 442 enables the user device 440 to receive and process image and sensor data from the monitoring system.

The user device 440 may be a general-purpose computer (e.g., a desktop personal computer, a workstation, or a laptop computer) that is configured to communicate with the monitoring server 460 and/or the control unit 410 over the network 405. The user device 440 may be configured to display a smart home user interface 452 that is generated by the user device 440 or generated by the monitoring server 460. For example, the user device 440 may be configured to display a user interface (e.g., a web page) provided by the monitoring server 460 that enables a user to perceive images captured by the camera 430 and/or reports related to the monitoring system. Although FIG. 4 illustrates two user devices for brevity, actual implementations may include more (and, perhaps, many more) or fewer user devices.

In some implementations, the one or more user devices 440 and 450 communicate with and receive monitoring system data from the control unit 410 using the communication link 438. For instance, the one or more user devices 440 and 450 may communicate with the control unit 410 using various local wireless protocols such as Wi-Fi, Bluetooth, Z-wave, Zigbee, HomePlug (ethernet over power line), or wired protocols such as Ethernet and USB, to connect the one or more user devices 440 and 450 to local security and automation equipment. The one or more user devices 440 and 450 may connect locally to the monitoring system and its sensors and other devices. The local connection may improve the speed of status and control communications because communicating through the network 405 with a remote server (e.g., the monitoring server 460) may be significantly slower.

Although the one or more user devices 440 and 450 are shown as communicating with the control unit 410, the one or more user devices 440 and 450 may communicate directly with the sensors and other devices controlled by the control unit 410. In some implementations, the one or more user devices 440 and 450 replace the control unit 410 and perform the functions of the control unit 410 for local monitoring and long range/offsite communication.

In other implementations, the one or more user devices 440 and 450 receive monitoring system data captured by the control unit 410 through the network 405. The one or more user devices 440, 450 may receive the data from the control unit 410 through the network 405 or the monitoring server 460 may relay data received from the control unit 410 to the one or more user devices 440 and 450 through the network 405. In this regard, the monitoring server 460 may facilitate communication between the one or more user devices 440 and 450 and the monitoring system.

In some implementations, the one or more user devices 440 and 450 may be configured to switch whether the one or more user devices 440 and 450 communicate with the control unit 410 directly (e.g., through link 438) or through the monitoring server 460 (e.g., through network 405) based on a location of the one or more user devices 440 and 450. For instance, when the one or more user devices 440 and 450 are located close to the control unit 410 and in range to communicate directly with the control unit 410, the one or more user devices 440 and 450 use direct communication. When the one or more user devices 440 and 450 are located far from the control unit 410 and not in range to communicate directly with the control unit 410, the one or more user devices 440 and 450 use communication through the monitoring server 460.

Although the one or more user devices 440 and 450 are shown as being connected to the network 405, in some implementations, the one or more user devices 440 and 450 are not connected to the network 405. In these implementations, the one or more user devices 440 and 450 communicate directly with one or more of the monitoring system components and no network (e.g., Internet) connection or reliance on remote servers is needed.

In some implementations, the one or more user devices 440 and 450 are used in conjunction with only local sensors and/or local devices in a house. In these implementations, the system 400 includes the one or more user devices 440 and 450, the sensors 420, the home automation controls 422, the camera 430, and the robotic devices 490. The one or more user devices 440 and 450 receive data directly from the sensors 420, the home automation controls 422, the camera 430, and the robotic devices 490, and sends data directly to the sensors 420, the home automation controls 422, the camera 430, and the robotic devices 490. The one or more user devices 440, 450 provide the appropriate interfaces/processing to provide visual surveillance and reporting.

In other implementations, the system 400 further includes network 405 and the sensors 420, the home automation controls 422, the camera 430, the thermostat 434, and the robotic devices 490, and are configured to communicate sensor and image data to the one or more user devices 440 and 450 over network 405 (e.g., the Internet, cellular network, etc.). In yet another implementation, the sensors 420, the home automation controls 422, the camera 430, the thermostat 434, and the robotic devices 490 (or a component, such as a bridge/router) are intelligent enough to change the communication pathway from a direct local pathway when the one or more user devices 440 and 450 are in close physical proximity to the sensors 420, the home automation controls 422, the camera 430, the thermostat 434, and the robotic devices 490 to a pathway over network 405 when the one or more user devices 440 and 450 are farther from the sensors 420, the home automation controls 422, the camera 430, the thermostat 434, and the robotic devices 490.

In some examples, the system leverages GPS information from the one or more user devices 440 and 450 to determine whether the one or more user devices 440 and 450 are close enough to the sensors 420, the home automation controls 422, the camera 430, the thermostat 434, and the robotic devices 490 to use the direct local pathway or whether the one or more user devices 440 and 450 are far enough from the sensors 420, the home automation controls 422, the camera 430, the thermostat 434, and the robotic devices 490 that the pathway over network 405 is required.

In other examples, the system leverages status communications (e.g., pinging) between the one or more user devices 440 and 450 and the sensors 420, the home automation controls 422, the camera 430, the thermostat 434, and the robotic devices 490 to determine whether communication using the direct local pathway is possible. If communication using the direct local pathway is possible, the one or more user devices 440 and 450 communicate with the sensors 420, the home automation controls 422, the camera 430, the thermostat 434, and the robotic devices 490 using the direct local pathway. If communication using the direct local pathway is not possible, the one or more user devices 440 and 450 communicate with the sensors 420, the home automation controls 422, the camera 430, the thermostat 434, and the robotic devices 490 using the pathway over network 405.

In some implementations, the system 400 provides end users with access to images captured by the camera 430 to aid in decision making. The system 400 may transmit the images captured by the camera 430 over a wireless WAN network to the user devices 440 and 450. Because transmission over a wireless WAN network may be relatively expensive, the system 400 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 430). In these implementations, the camera 430 may be set to capture images on a periodic basis when the alarm system is armed in an "away" state, but set not to capture images when the alarm system is armed in a "home" state or disarmed. In addition, the camera 430 may be triggered to begin capturing images when the alarm system detects an event, such as an alarm event, a door-opening event for a door that leads to an area within a field of view of the camera 430, or motion in the area within the field of view of the camera 430. In other implementations, the camera 430 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A computer-implemented method comprising:
receiving data indicating one or more planned milestones for construction or service of a building at a property;
providing, as input to a machine learning model trained to generate output that indicates parameters of an inspection to be performed by a drone, the received data, wherein the parameters include a time and a type of inspection to be performed by the drone;
maintaining, in one or more computer memories, data representing an expected floor plan for all of the building at the property including second data identifying a plurality of space types for the expected floor plan, wherein the expected floor plan (i) defines a plurality of expected physical objects of the property, (ii) includes expected dimensions of each physical object of the expected physical objects of the property, and (iii) includes an expected material for each physical object of the expected physical objects of the property;
obtaining sensor data of the property using the drone that has one or more sensors;
detecting, using the sensor data, a space type for a portion of the property;
selecting, using the detected space type and from the plurality of space types maintained in the one or more computer memories, a maintained space type;
generating, using the sensor data, a sensed floor plan for all of the building at the property that (i) defines a plurality of sensed physical objects of the property and (ii) includes sensed dimensions of each physical object of the plurality of sensed physical objects of the property, wherein the sensed floor plan comprises different data from the expected floor plan;
adjusting the sensed floor plan by:
(i) removing one or more non-structural items from the sensed floor plan,
(ii) reducing a polygon count of one or more polygonal surfaces of the sensed floor plan, and
(iii) converting the sensed floor plan into a two-dimensional representation;
identifying an issue with the property by:
comparing the adjusted sensed floor plan representing all of the building at the property and the expected floor plan representing all of the building at the property, wherein the comparing comprises:
(i) the plurality of sensed physical objects of the property and (ii) the sensed dimensions of each physical object of the plurality of sensed physical objects of the property of the adjusted sensed floor plan with
(i) the plurality of expected physical objects of the property and (ii) the expected dimensions of each physical object of the expected physical objects of the property of the expected floor plan; and
determining, using the maintained space type, whether a requirement applicable to the maintained space type is not met;
in response to identifying the issue with the property by comparing the adjusted sensed floor plan with the expected floor plan and determining whether the requirement applicable to the maintained space type is not met, transmitting a signal to the drone configured to cause the drone to obtain additional sensor data using a more intensive mapping technique compared to the prior obtaining of the sensor data;
after obtaining the additional sensor data of the property using the more intensive mapping technique, generating a notification that includes an indication of the issue;
transmitting the notification to a computing device of a user
determining, using the data representing the expected floor plan for the property, an expected location of a specific physical object of the plurality of expected physical objects of the property; and
transmitting a signal to the drone configured to cause the drone to obtain sensor data at the expected location of the specific physical object.

2. The computer-implemented method of claim 1, comprising:

maintaining a plurality of floor plans in the one or more computer memories, wherein:

the plurality of floor plans includes the expected floor plan for the property, and the plurality of floor plans includes data indicating (i) a space type for the expected floor plan and a second space type, different than the space type, for a second floor plan and (ii) requirements for each floor plan; and determining the space type of the expected floor plan, wherein identifying the issue with the property comprises:

determining, based on the space type of the expected floor plan, that a requirement of one or more requirements applicable to the space type is not met.

3. The computer-implemented method of claim 2, wherein determining that the requirement applicable to the space type is not met comprises:

determining, from the adjusted sensed floor plan representing all of the building, that the requirement applicable to the space type is not met.

4. The computer-implemented method of claim 1, comprising:

determining, using the plurality of sensed physical objects of the property, a space type for a portion of the property sensed by the one or more sensors of the drone.

5. The computer-implemented method of claim 4, comprising:

identifying, using the determined space type, a set of prioritized elements corresponding to one or more of the plurality of sensed physical objects of the property, wherein identifying the issue with the property comprises:

comparing the set of prioritized elements with elements of the expected floor plan.

6. The computer-implemented method of claim 1, wherein obtaining the sensor data of the property using the drone occurs in response to a triggering event, and generating the sensed floor plan using the sensor data comprises generating a floor plan that includes specific elements corresponding to one or more of the plurality of sensed physical objects, wherein the specific elements are determined using the triggering event.

7. The computer-implemented method of claim 1, wherein transmitting the notification to the computing device of the user comprises:

transmitting a notification that includes an indication that an object, of the plurality of sensed physical objects of the property, is damaged.

8. The computer-implemented method of claim 1, wherein identifying the issue with the property comprises:

comparing sensed dimensions of each physical object of the plurality of sensed physical objects with expected dimensions of each physical object of the expected physical objects of the property; and identifying the issue with the property based on the comparison indicating a difference between the sensed dimensions and the expected dimensions of at least one object of the property.

9. The computer-implemented method of claim 8, wherein identifying the issue with the property based on the comparison indicating the difference comprises determining that the difference satisfies a difference threshold.

10. The computer-implemented method of claim 1, wherein identifying the issue with the property comprises:

comparing a sensed location of each of the plurality of sensed physical objects with an expected location of each of the expected physical objects of the property; and identifying the issue with the property based on the comparison indicating a difference between the sensed location and the expected location of at least one object of the property.

11. The computer-implemented method of claim 1, comprising:

determining a portion of the property as an area of interest; and in response to determining the portion of the property as an area of interest, transmitting a signal to the drone configured to cause the drone to capture additional sensor data of the portion of the property.

12. The computer-implemented method of claim 11, wherein transmitting the signal to the drone comprises:

transmitting a signal configured to cause the drone to capture more images of the portion of the property than images of other portions of the property.

13. The computer-implemented method of claim 1, wherein generating the notification that includes the indication of the issue occurs in response to identifying the issue with the property by both (i) comparing the sensed floor plan and the expected floor plan and (ii) determining that the requirement applicable to the maintained space type is not met.

14. A system comprising:

one or more computers; and one or more computer-readable media storing instructions that, when executed by the one or more computers, cause the one or more computers to perform operations comprising:

receiving data indicating one or more planned milestones for construction or service of a building at a property;

providing, as input to a machine learning model trained to generate output that indicates parameters of an inspection to be performed by a drone, the received data, wherein the parameters include a time and a type of inspection to be performed by the drone;

maintaining, in one or more computer memories, data representing an expected floor plan for all of the building at the property including second data identifying a plurality of space types for the expected floor plan, wherein the expected floor plan (i) defines a plurality of expected physical objects of the property, (ii) includes expected dimensions of each physical object of the expected physical objects of the property, and (iii) includes an expected material for each physical object of the expected physical objects of the property;

obtaining sensor data of the property using the drone that has one or more sensors;

detecting, using the sensor data, a space type for a portion of the property;

selecting, using the detected space type and from the plurality of space types maintained in the one or more computer memories, a maintained space type;

generating, using the sensor data, a sensed floor plan for all of the building at the property that (i) defines a plurality of sensed physical objects of the property and (ii) includes sensed dimensions of each physical object of the plurality of sensed physical objects of the property, wherein the sensed floor plan comprises different data from the expected floor plan;

adjusting the sensed floor plan by:

(i) removing one or more non-structural items from the sensed floor plan, (ii) reducing a polygon count of one or more polygonal surfaces of the sensed floor plan, and (iii) converting the sensed floor plan into a two-dimensional representation;

identifying an issue with the property by:

comparing the adjusted sensed floor plan representing all of the building at the property and the expected floor plan representing all of the building at the property, wherein the comparing comprises:

(i) the plurality of sensed physical objects of the property and (ii) the sensed dimensions of each physical object of the plurality of sensed physical objects of the property of the adjusted sensed floor plan with (i) the plurality of expected physical objects of the property and (ii) the expected dimensions of each physical object of the expected physical objects of the property of the expected floor plan; and determining, using the maintained space type, whether a requirement applicable to the maintained space type is not met;

in response to identifying the issue with the property by comparing the adjusted sensed floor plan with the expected floor plan and determining whether the requirement applicable to the maintained space type is not met, transmitting a signal to the drone configured to cause the drone to obtain additional sensor data using a more intensive mapping technique compared to the prior obtaining of the sensor data;

after obtaining the additional sensor data of the property using the more intensive mapping technique, generating a notification that includes an indication of the issue;

transmitting the notification to a computing device of a user;

determining, using the data representing the expected floor plan for the property, an expected location of a specific physical object of the plurality of expected physical objects of the property; and transmitting a signal to the drone configured to cause the drone to obtain sensor data at the expected location of the specific physical object.

15. One or more non-transitory computer-readable media storing instructions that, when executed by one or more computers, cause the one or more computers to perform operations comprising:

receiving data indicating one or more planned milestones for construction or service of a building at a property;

providing, as input to a machine learning model trained to generate output that indicates parameters of an inspection to be performed by a drone, the received data, wherein the parameters include a time and a type of inspection to be performed by the drone;

maintaining, in one or more computer memories, data representing an expected floor plan for all of the building at the property including second data identifying a plurality of space types for the expected floor plan, wherein the expected floor plan (i) defines a plurality of expected physical objects of the property, (ii) includes expected dimensions of each physical object of the expected physical objects of the property, and (iii) includes an expected material for each physical object of the expected physical objects of the property;

obtaining sensor data of the property using the drone that has one or more sensors;

detecting, using the sensor data, a space type for a portion of the property;

selecting, using the detected space type and from the plurality of space types maintained in the one or more computer memories, a maintained space type;

generating, using the sensor data, a sensed floor plan for all of the building at the property that (i) defines a plurality of sensed physical objects of the property and (ii) includes sensed dimensions of each physical object of the plurality of sensed physical objects of the property, wherein the sensed floor plan comprises different data from the expected floor plan;

adjusting the sensed floor plan by:

(i) removing one or more non-structural items from the sensed floor plan, (ii) reducing a polygon count of one or more polygonal surfaces of the sensed floor plan, and (iii) converting the sensed floor plan into a two-dimensional representation;

identifying an issue with the property by:

comparing the adjusted sensed floor plan representing all of the building at the property and the expected floor plan representing all of the building at the property, wherein the comparing comprises:

(i) the plurality of sensed physical objects of the property and (ii) the sensed dimensions of each physical object of the plurality of sensed physical objects of the property of the adjusted sensed floor plan with (i) the plurality of expected physical objects of the property and (ii) the expected dimensions of each physical object of the expected physical objects of the property of the expected floor plan; and determining, using the maintained space type, whether a requirement applicable to the maintained space type is not met;

in response to identifying the issue with the property by comparing the adjusted sensed floor plan with the expected floor plan and determining whether the requirement applicable to the maintained space type is not met, transmitting a signal to the drone configured to cause the drone to obtain additional sensor data using a more intensive mapping technique compared to the prior obtaining of the sensor data;

after obtaining the additional sensor data of the property using the more intensive mapping technique, generating a notification that includes an indication of the issue;

transmitting the notification to a computing device of a user;

determining, using the data representing the expected floor plan for the property, an expected location of a specific physical object of the plurality of expected physical objects of the property; and transmitting a signal to the drone configured to cause the drone to obtain sensor data at the expected location of the specific physical object.

* * * * *